United States Patent
Shigenai et al.

[11] Patent Number: 5,940,248
[45] Date of Patent: Aug. 17, 1999

[54] MECHANISM IN DISK DRIVE APPARATUS FOR PREVENTING INSERTION OF A DISK CARTRIDGE WHEN THE SHUTTER DISK CARTRIDGE IS CLOSED

[75] Inventors: Osamu Shigenai; Masao Ohkita; Daijo Shibata, all of Miyagi-ken; Yuji Inada, Fukushima-ken; Makito Takigawa, Fukushima-ken; Toru Sawada, Fukushima-ken, all of Japan

[73] Assignee: Alps Electric Co., Ltd., Tokyo, Japan

[21] Appl. No.: 08/972,128

[22] Filed: Nov. 17, 1997

[30] Foreign Application Priority Data

Nov. 19, 1996 [JP] Japan .................................. 8-308313

[51] Int. Cl.[6] .................................................. G11B 17/02
[52] U.S. Cl. ..................................... 360/99.12; 360/97.01
[58] Field of Search ............................. 360/97.01, 98.08, 360/99.02, 99.03, 99.06, 99.12

[56] References Cited

U.S. PATENT DOCUMENTS

| | | | |
|---|---|---|---|
| 4,688,123 | 8/1987 | Sokol et al. ...................... | 360/99.02 |
| 5,481,420 | 1/1996 | Cardona et al. .................... | 360/99.06 |
| 5,537,271 | 7/1996 | Kumai et al. ...................... | 360/99.06 |
| 5,663,852 | 9/1997 | Fujimori et al. ................... | 360/99.12 |
| 5,768,241 | 6/1998 | Kanazawa et al. ................ | 360/99.06 X |

*Primary Examiner*—John H. Wolff
*Attorney, Agent, or Firm*—Brinks Hofer Gilson & Lione

[57] ABSTRACT

A first and second rotary members are supported on a holder 3 secured to a main chassis of disk drive apparatus. The first rotary member includes a detecting portion. The second rotary member includes a contact portion that moves in and out of the insertion path of a disk cartridge to be inserted into the holder. When the disk cartridge is being inserted, an opening-and-closing pin opens the shutter of the disk. Through the detecting portion, the opening shutter rotates the first rotary member, which then rotates the second rotary member to thereby move the contact portion of the second rotary member out of the insertion path of the disk cartridge, allowing the disk cartridge to be inserted. If the shutter fails to open when the disk cartridge is being inserted, the contact portion of the second rotary member will remain in the insertion path and block the insertion of the disk cartridge.

8 Claims, 22 Drawing Sheets

FIG. I

MECHANISM IN DISK DRIVE APPARATUS FOR PREVENTING INSERTION OF A DISK CARTRIDGE WHEN THE SHUTTER DISK CARTRIDGE IS CLOSED

BACKGROUND OF THE INVENTION

1. Field of the Invention

The present invention broadly relates to a disk drive device for allowing recording of information onto and reproduction of information from a recording medium, such as a magnetic disk, and, more particularly, to a shutter opening-and-closing mechanism for opening and closing the shutter of a disk cartridge containing a disk.

2. Description of the Related Art

For example, a magnetic recording/reproducing apparatus for recording and/or reproducing information to and from a magnetic disk contained in a disk cartridge is constructed such that when a disk cartridge with a shutter is inserted in an opening in the front face of the apparatus, the shutter is opened, and when the disk cartridge is taken out from the opening, the shutter is closed.

A known conventional shutter opening-and-closing mechanism of the aforementioned type is disclosed, for example, in Japanese Patent Laid-Open No. 4-186555. The shutter opening-and-closing mechanism, which along with a pair of magnetic heads, is provided in the magnetic recording/reproducing apparatus. The shutter opening-and-closing pin is slidably mounted in a guide hole formed in the top surface of the holder, and is biased unidirectionally by a spring. The disk cartridge includes a hard-plastic cartridge case, a magnetic disk rotatably contained in the cartridge case, and a shutter which can reciprocate along one side edge of the cartridge case, with an opening formed in a portion of the cartridge case. The shutter is biased unidirectionally by a spring, and includes a cutout engagable with the shutter opening-and-closing pin, and a window formed in correspondence with the opening in the cartridge case.

While the disk cartridge is being inserted into the holder from the opening, the shutter opening-and-closing pin engages the cutout in the shutter, causing the pin to move within the guide hole against the tensile force of the spring. When the disk cartridge is pushed further into the holder, and the shutter opening-and-closing pin reaches the terminal end of the guide hole, the shutter opens completely. With the shutter completely opened, the magnetic disk exposed through the opening and the window moves into a location between the pair of magnetic heads, whereby the magnetic heads record information onto and/or reproduce information from the magnetic disk.

In the above-described conventional apparatus, however, when, for example, the disk cartridge is inserted into the holder with too much force, the shutter opening-and-closing pin may bounce off the shutter and disengage the cutout in the shutter. When the disk cartridge is further pushed into the holder, with the pin disengaged, the shutter opening-and-closing pin, moves in the guide hole, without being engaged in the cutout, causing the disk cartridge to be pushed into the holder, with its shutter closed. Thus, the magnetic heads hit the shutter, remaining closed, which may damage or scratch them.

SUMMARY OF THE INVENTION

The present invention overcomes the above-described problem by providing a stopper means for stopping insertion of a disk cartridge when its shutter fails to open and for allowing insertion of a disk cartridge when its shutter is open. Such a stopper means stops the disk cartridge at a location just in front of the loaded position of the disk cartridge, if, by any chance, the shutter fails to open because, for example, the shutter opening-and-closing pin bounces off the shutter, thereby reliably preventing the heads from being scratched or damaged.

A stopper means for detecting whether a shutter is open or closed in order to selectively stop insertion of a disk cartridge is provided in a disk drive device including a head transfer mechanism for transferring a head in a direction of a diameter of a disk, and a shutter opening-and-closing member movably supported by a holder. In the disk drive device, inserting or removing the disk cartridge containing the disk into and from the holder causes the shutter opening-and-closing member to open or close the shutter of the disk cartridge. When the shutter fails to open, the stopper means stops the insertion of the disk cartridge. On the other hand, when the shutter is opened, the stopper means moves out of the insertion path of the disk cartridge.

In a construction, the stopper means may be formed by a stopper member rotatably supported by the holder. The stopper member includes a detecting portion for detecting whether the shutter is open or closed, and a contact portion disposed at the front face of the disk cartridge in the direction of insertion thereof. In such a construction, when the shutter fails to open, the contact portion stops the insertion of the disk cartridge, and when the shutter is open, the detecting portion contacts the shutter, causing the stopper member to rotate, and thus the contact portion to move out of the insertion path of the disk cartridge. This allows the disk cartridge to be inserted to the loaded position.

Although the stopper member may comprise one member, the stopper member may also comprise a first rotary member and a second rotary member which engage each other through a cam portion, with the first rotary member including a detecting portion, and the second rotary member including the contact portion. In such a construction, it is possible to freely set the timing at which the detecting portion contacts the shutter and starts to rotate the first rotary member, and the timing at which the contact portion, with the movement of the first rotary member, starts to move out of the insertion path of the disk cartridge.

The first rotary member and the second rotary member may cross at substantially right angles to each other. In such a case, the second rotary member provides the required stopper strength, allowing the first rotary member to rotate with a small force.

In addition, the first rotary member and the second rotary member may each be rotatably supported at the upper surface of the holder, such that the detecting portion and the contact portion extend downward through a through hole in the upper surface of the holder, allowing the space within the apparatus to be effectively used, thus preventing larger apparatuses from being produced.

Further, a spring may be provided between the second rotary member and the holder in order to bias the contact portion in the insertion path direction of the disk cartridge. In such a case, not only can the contact portion be reliably restored back into the insertion path of the disk cartridge, but the first rotary member can also be restored back to its initial position through the second rotary member.

Further, a controlling member, which contacts the upper surface of the disk cartridge, may be provided so as to be rotatably supported by the second rotary member. When the controlling member is used to keep the contact portion out of the insertion path after the detecting portion moves over the shutter, the disk cartridge can be moved back slightly and then re-inserted, during insertion of the disk cartridge, after the contact portion moves out of the insertion path of the disk cartridge.

Although the disk cartridge can take any form, a recess, allowing passage of the detecting portion, may be formed in the disk cartridge. When the shutter is made to move towards a front open end of the recess, but the shutter fails to open, the detecting portion passes above the recess, so that the detecting portion can contact the shutter only when the shutter is successfully opened.

DESCRIPTION OF THE PREFERRED EMBODIMENTS

Figure 1:
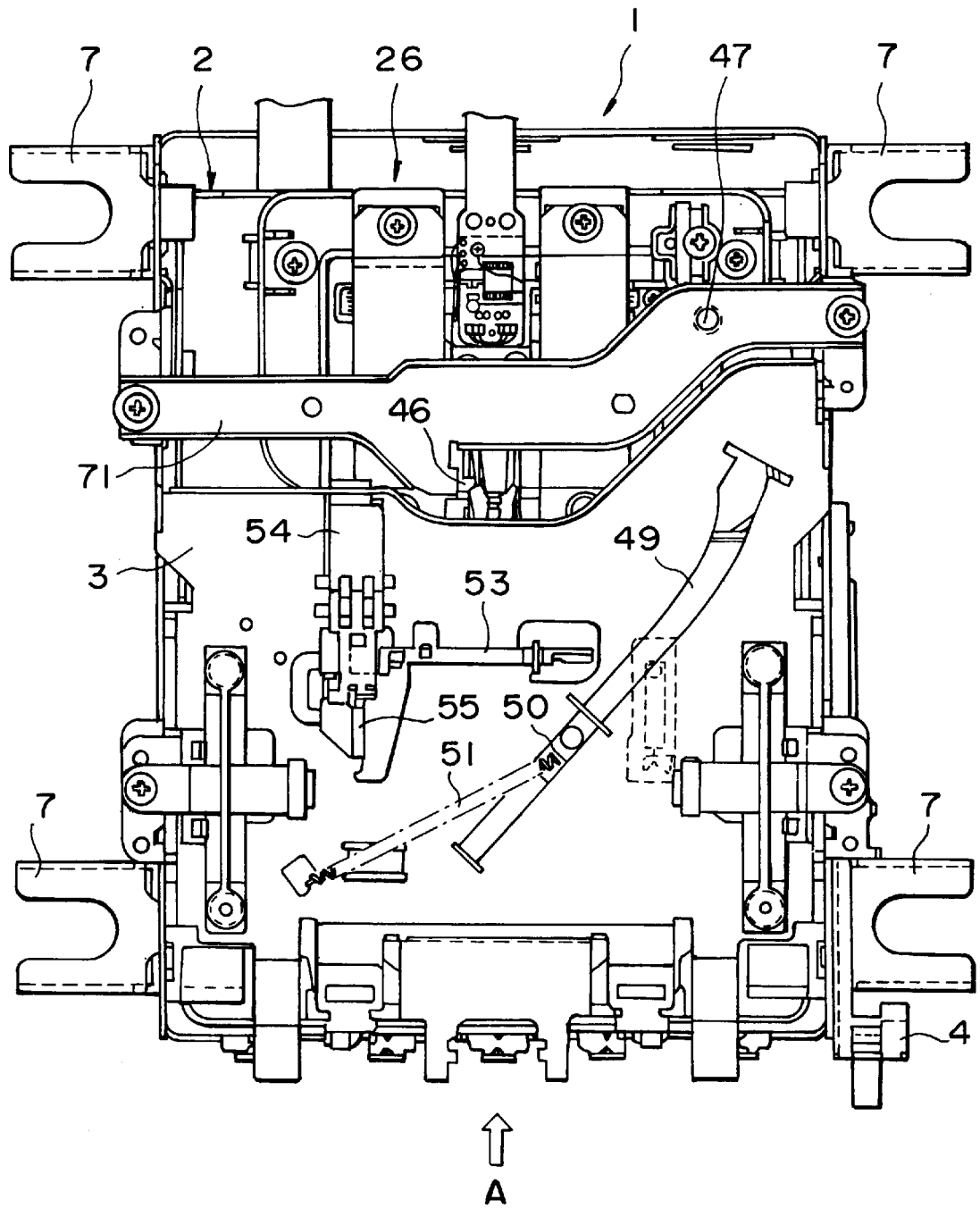
FIG. 1 is a plan view of a magnetic recording/reproducing apparatus in an embodiment in accordance with the present invention.
Figure 2:
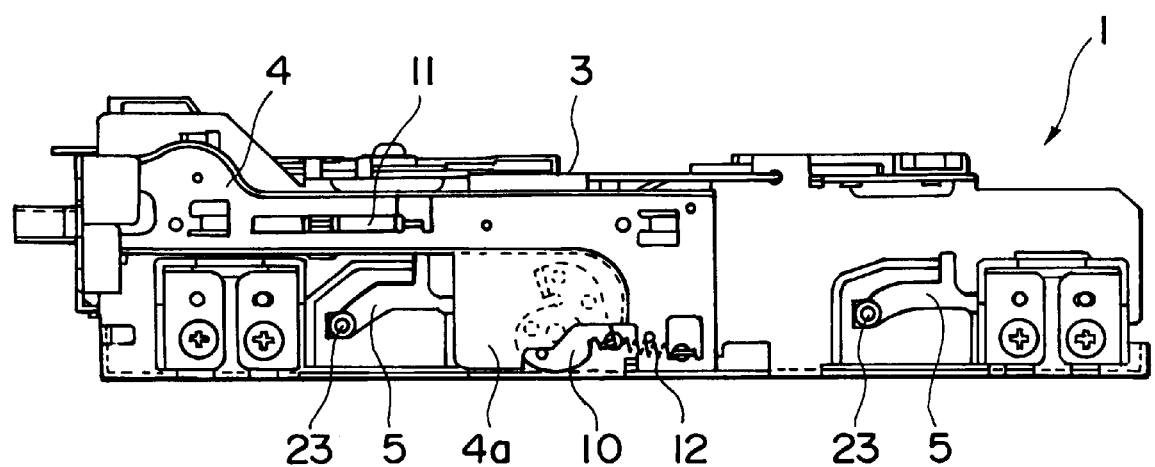
FIG. 2 is a right side view of the magnetic recording/reproducing apparatus.
Figure 3:
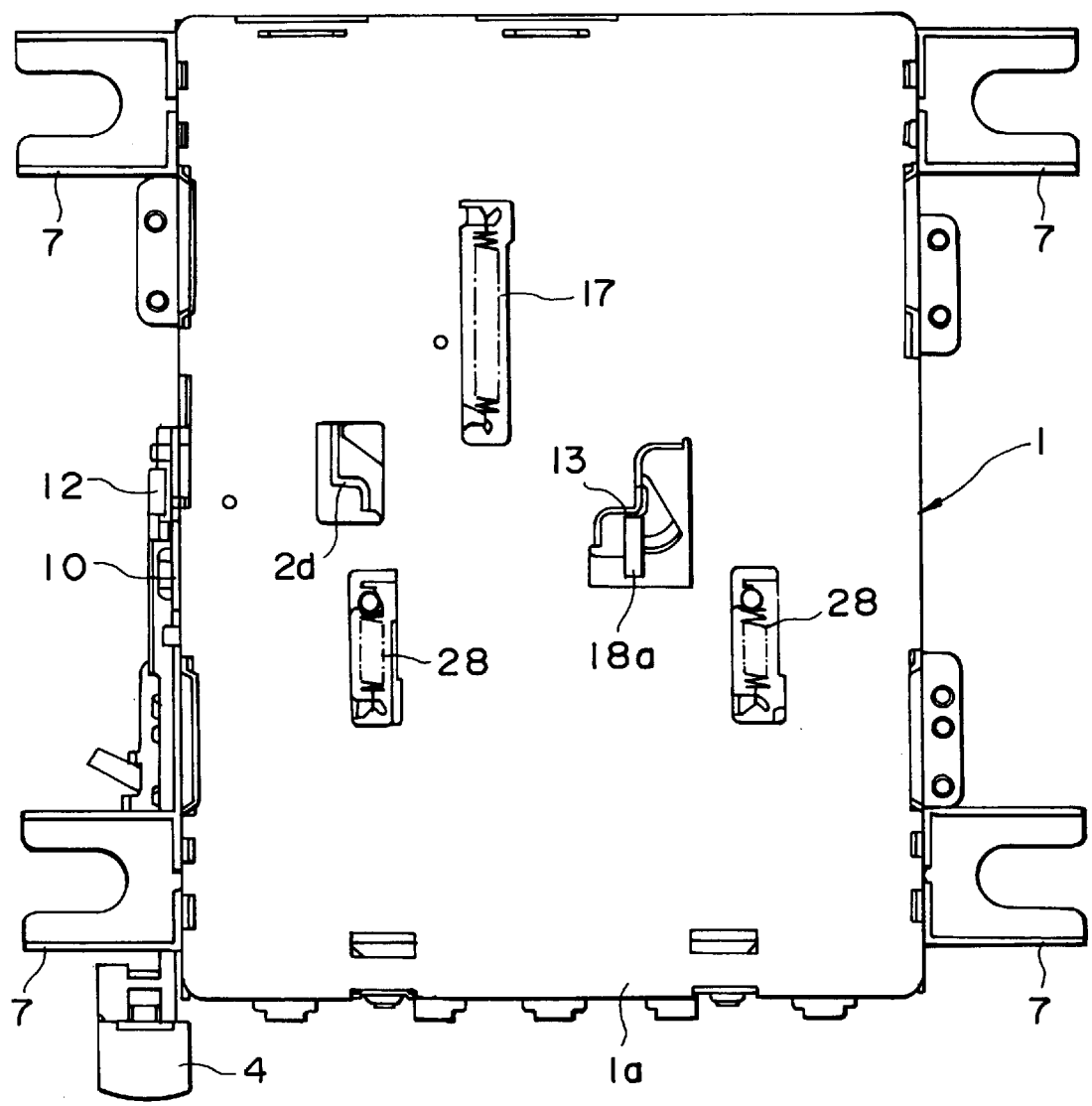
FIG. 3 is a bottom view of the magnetic recording/reproducing apparatus.
Figure 4:
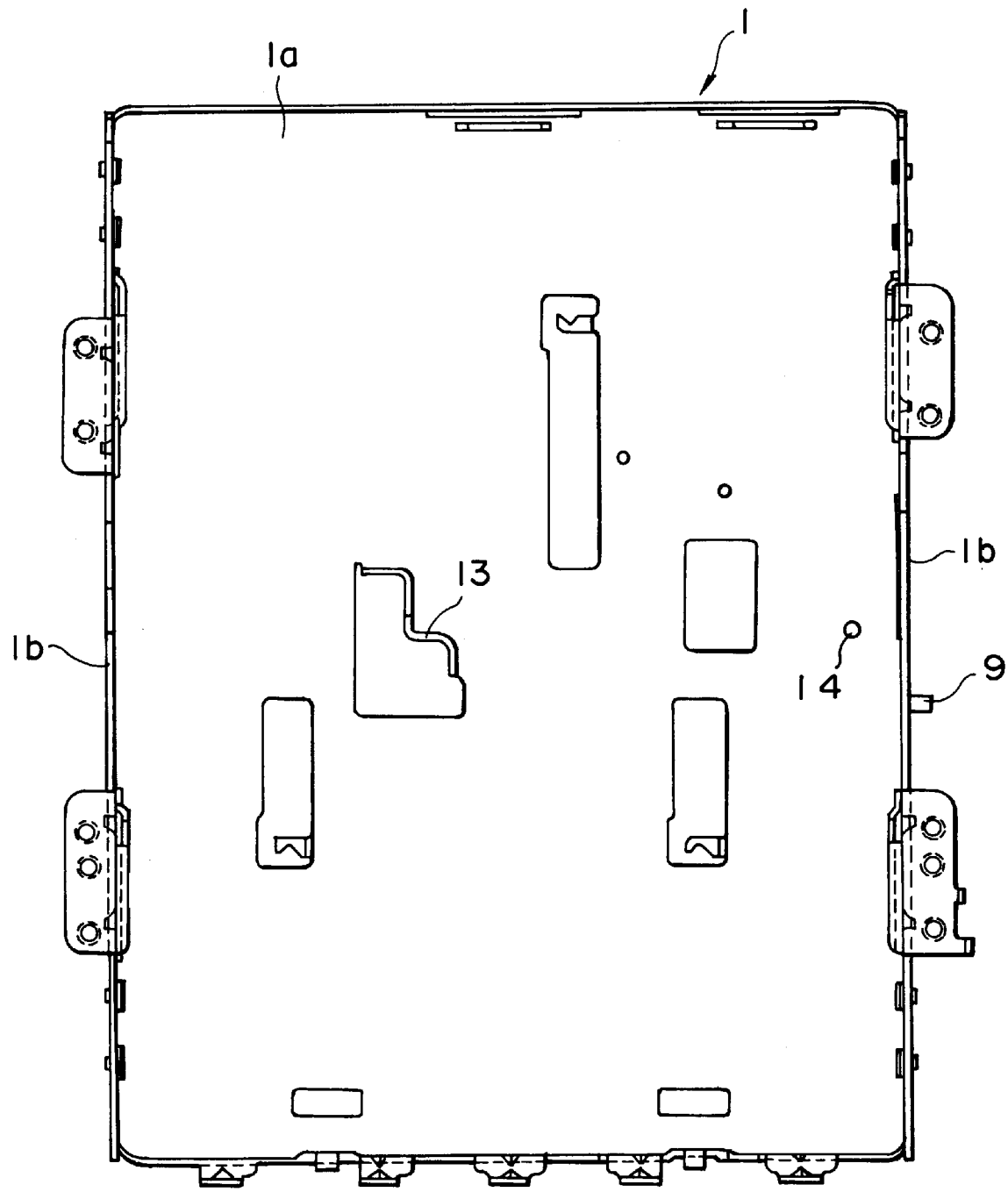
FIG. 4 is a plan view of the main chassis.
Figure 5:
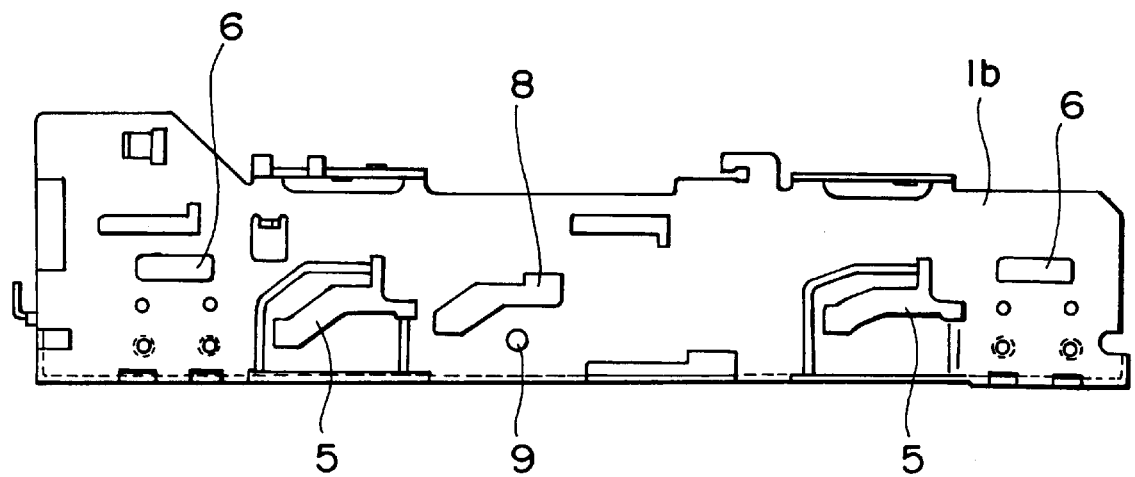
FIG. 5 is a right side view of the main chassis.
Figure 6:
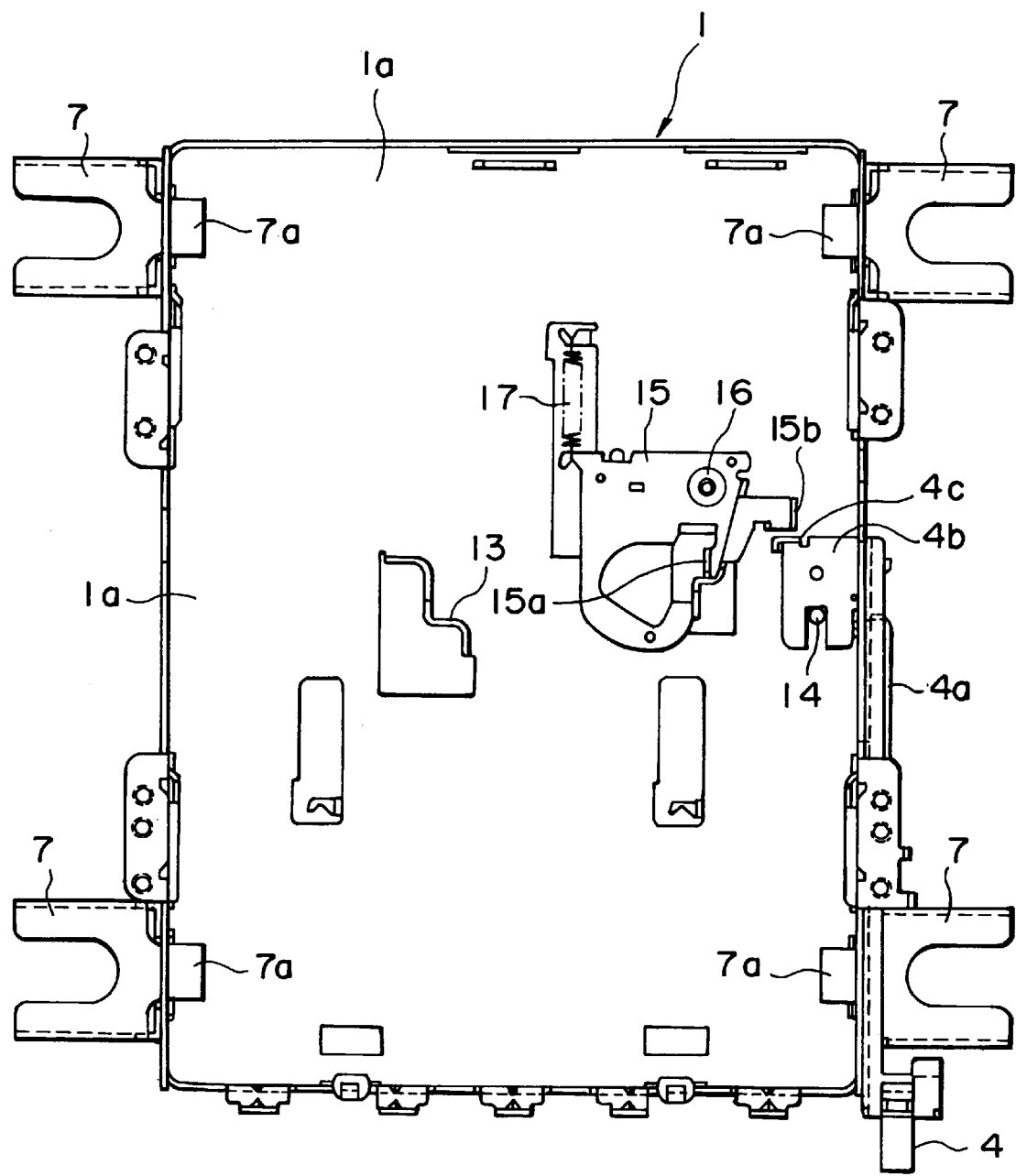
FIG. 6 is a plan view showing the main chassis having the eject lever, the first lock lever, and the like, mounted thereto.
Figure 7:
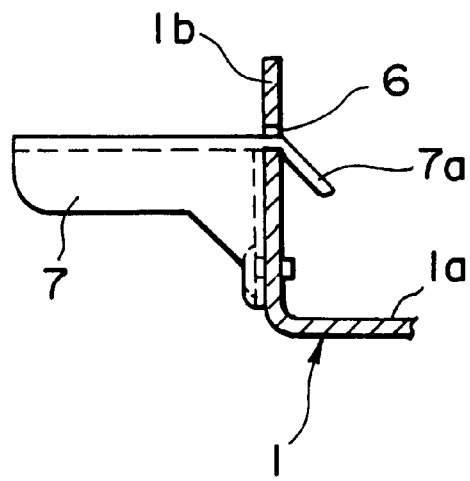
FIG. 7 is a sectional view showing the mounting plate in a mounted state.
Figure 8:
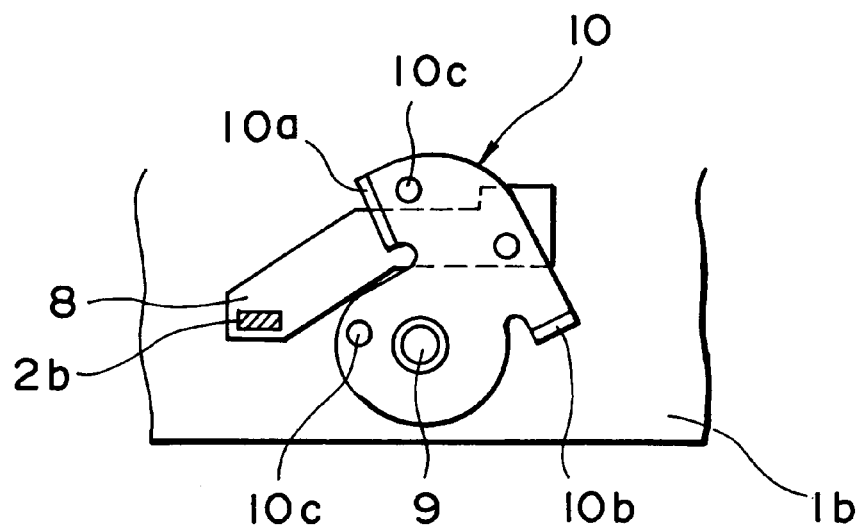
FIG. 8 is a side view of the auxiliary lever in a mounted state.
Figure 9:
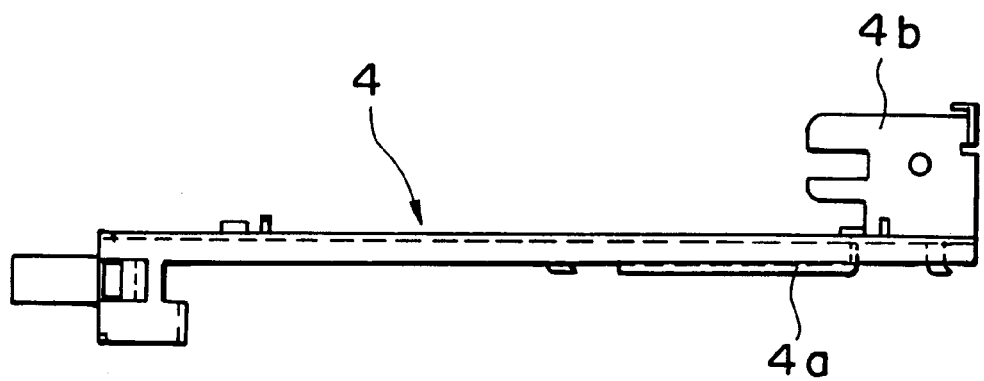
FIG. 9 is a plan view of the eject lever.
Figure 10:
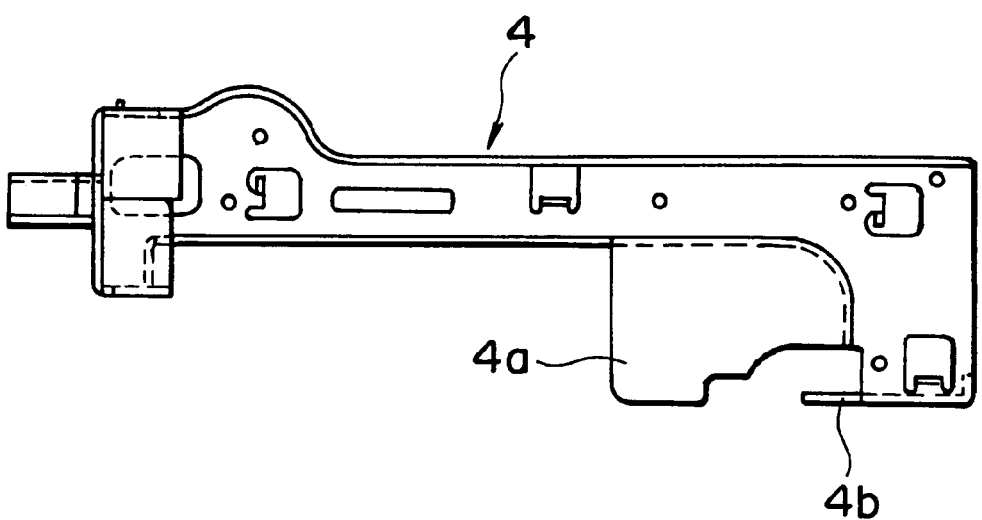
FIG. 10 is a side view of the eject lever.
Figure 11:
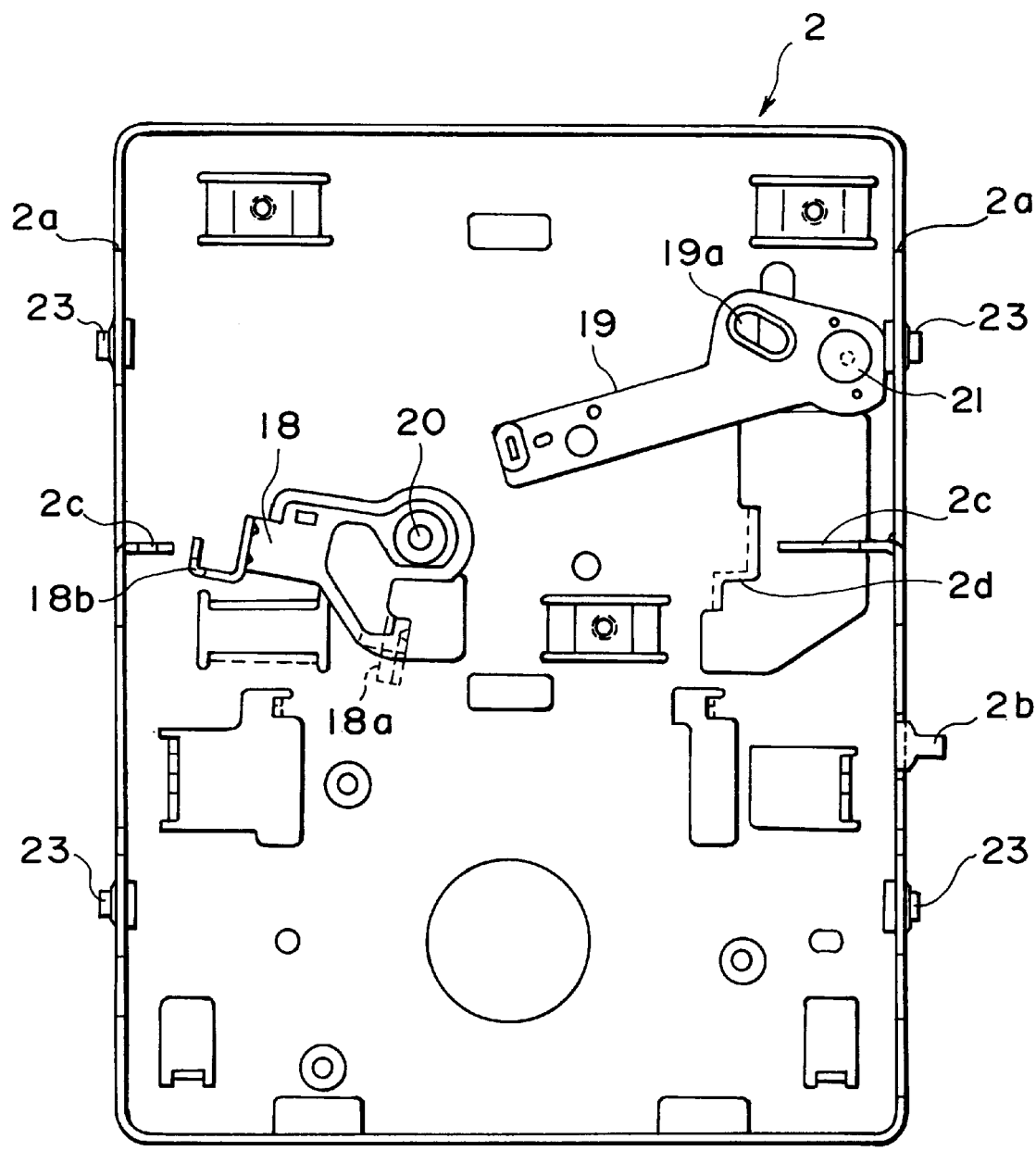
FIG. 11 is a plan view of the sub-chassis.
Figure 12:
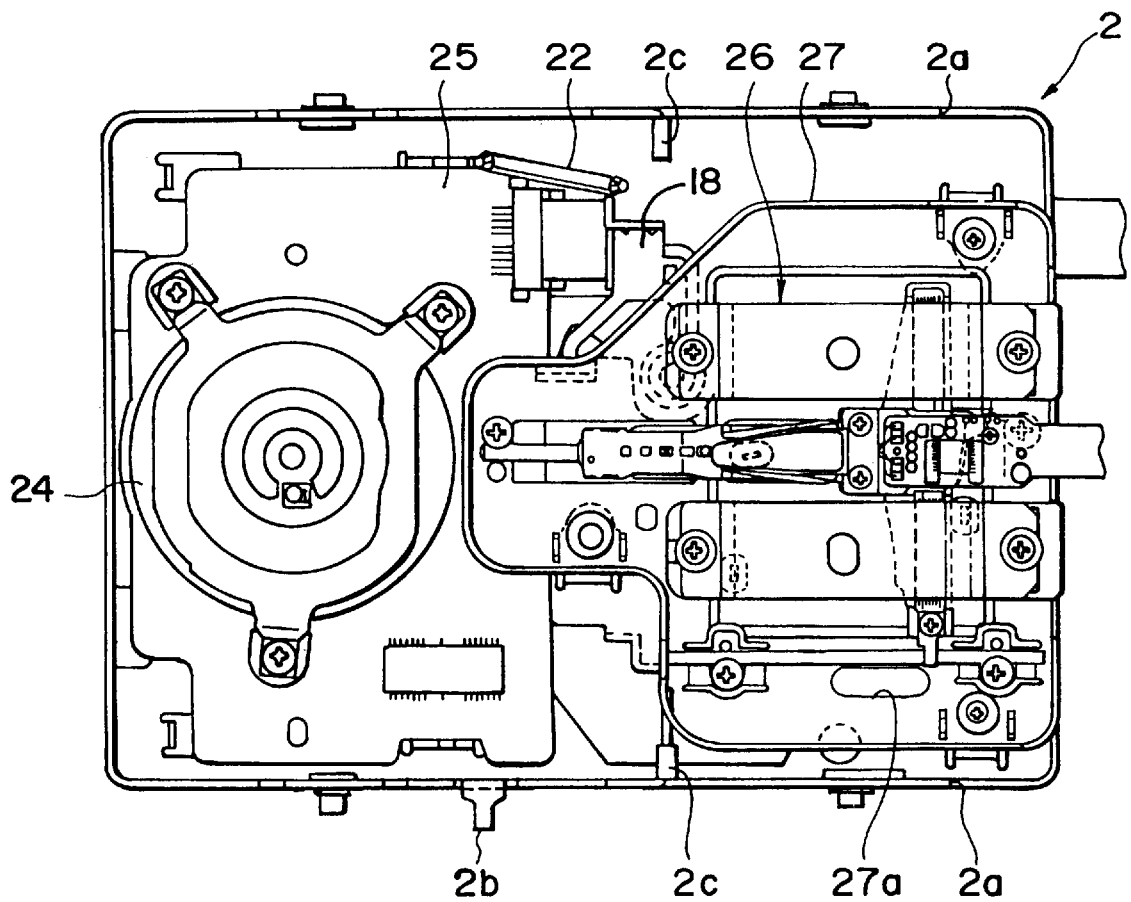
FIG. 12 is a plan view showing the sub-chassis having the head transfer mechanism and the like mounted thereto.
Figure 13:
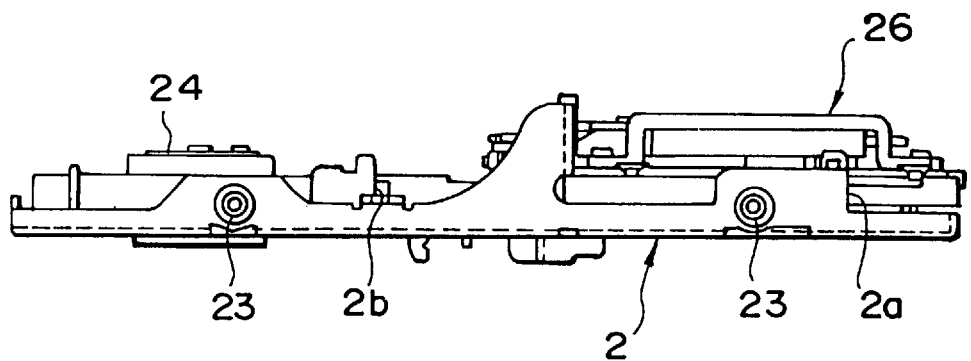
FIG. 13 is a side elevational view of the sub-chassis.
Figure 14:
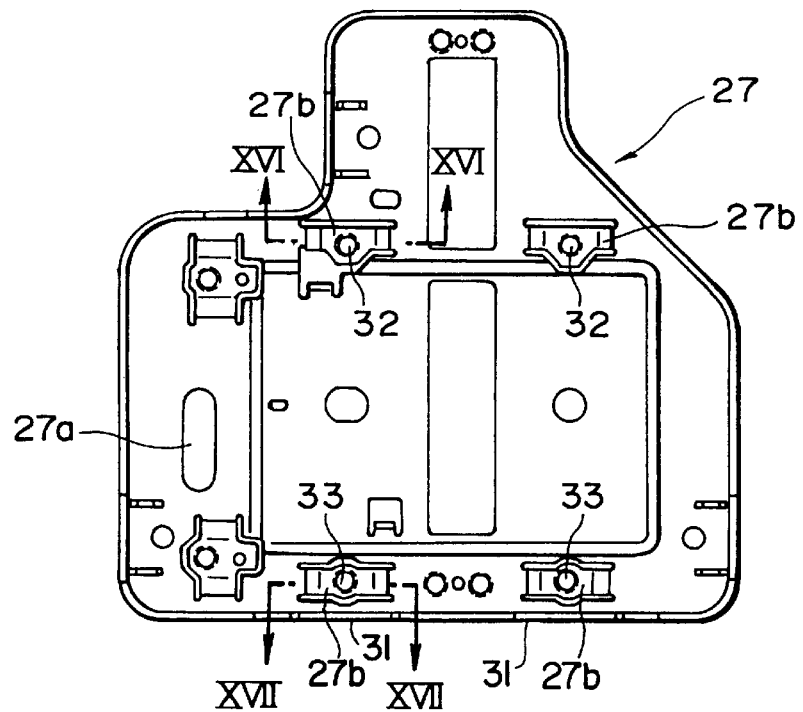
FIG. 14 is a plan view of the supporting plate.
Figure 15:
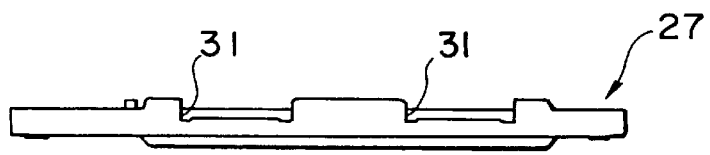
FIG. 15 is a rear view of the supporting plate.
Figure 16:
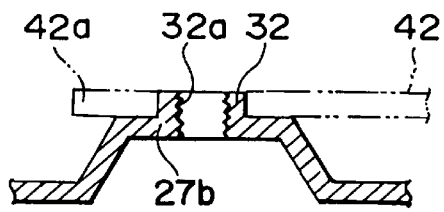
FIG. 16 is a sectional view taken along line XVI—XVI of FIG. 14.
Figure 17:
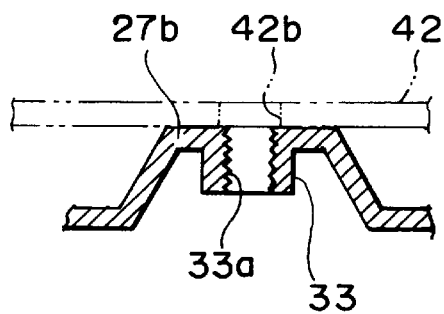
FIG. 17 is a sectional view taken along line XVII—XVII of FIG. 14.
Figure 18:
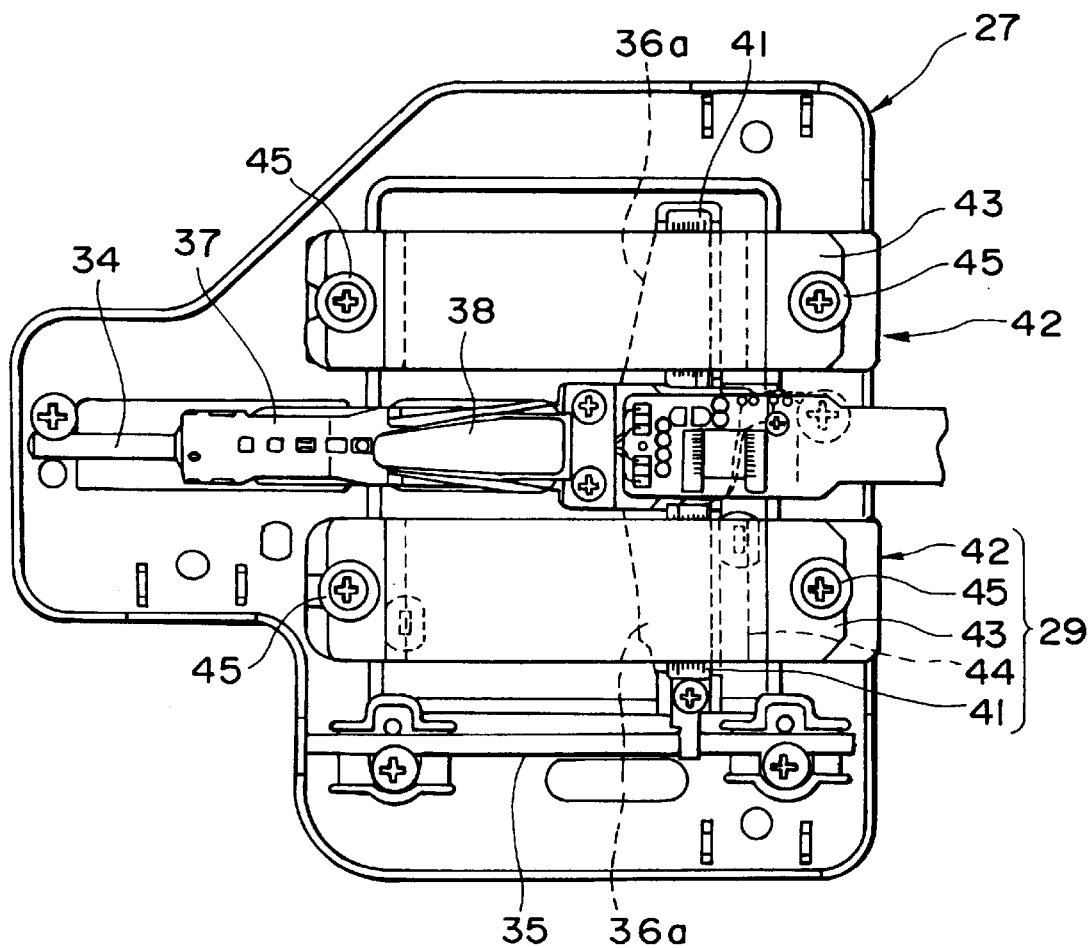
FIG. 18 is a plan view of the head transfer mechanism.
Figure 19:
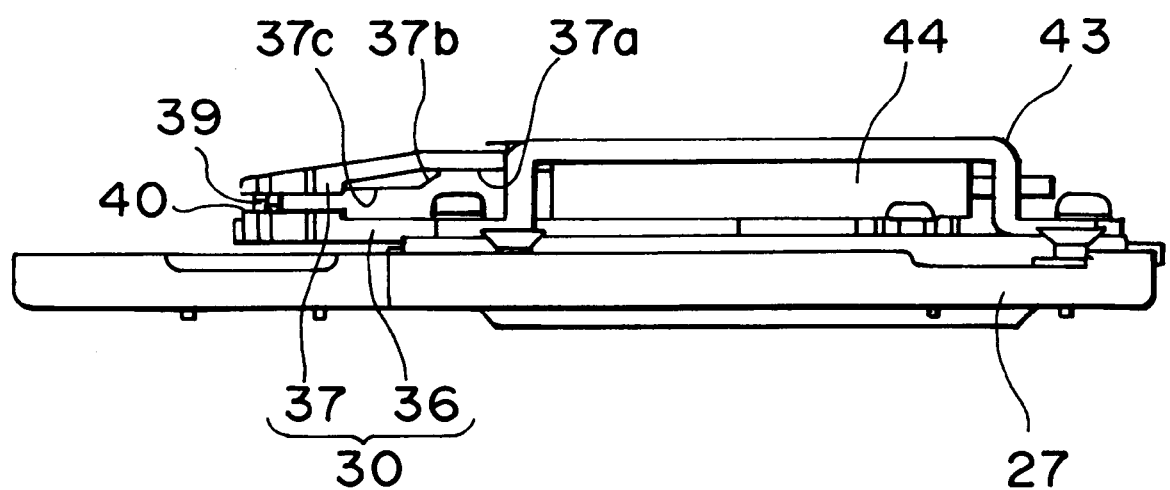
FIG. 19 is a side view of the head transfer mechanism.
Figure 20:
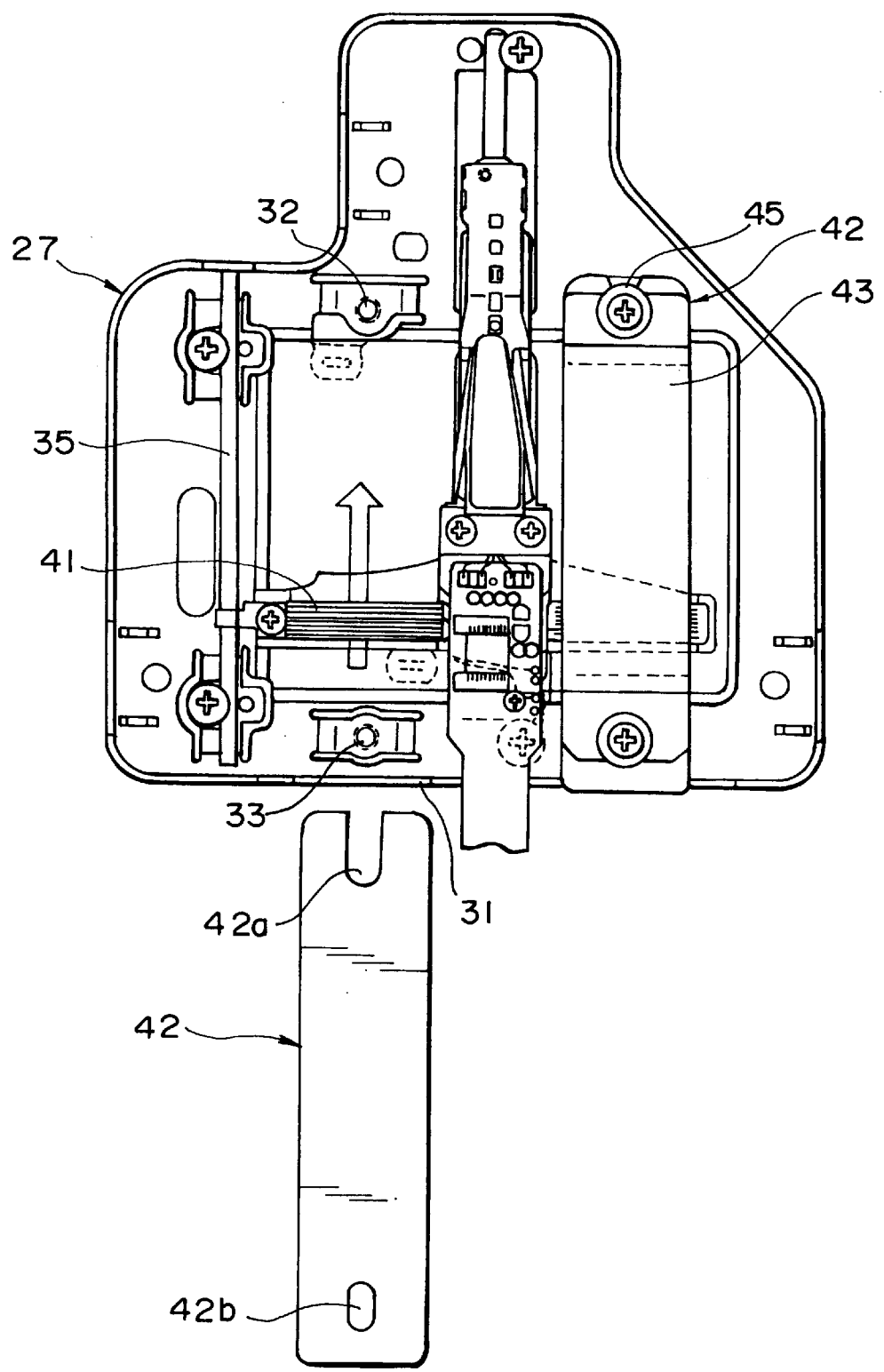
FIG. 20 is a plan view illustrating how the head transfer mechanism is assembled.
Figure 21:
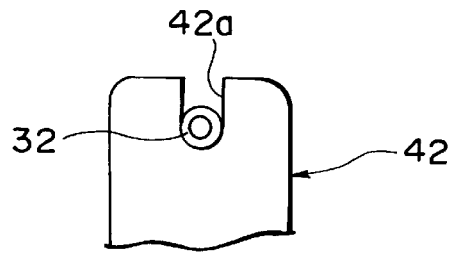
FIG. 21 is a view showing the bottom yoke and the cylindrical protrusion in an engaged state.
Figure 22A:
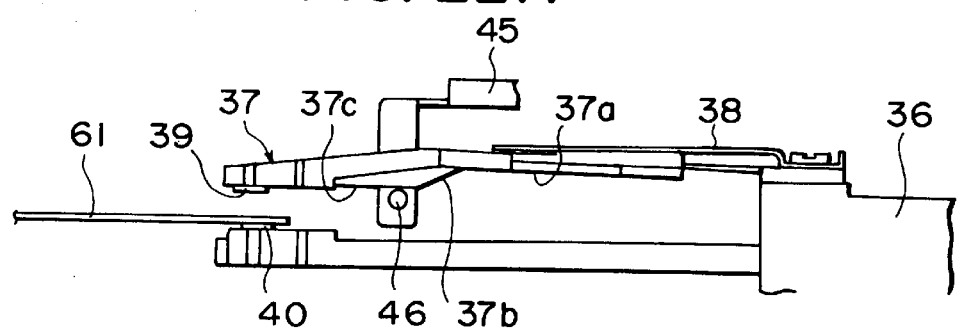
FIGS. 22A to 22C are view illustrating the operations of the head transfer mechanism.
Figure 22B:
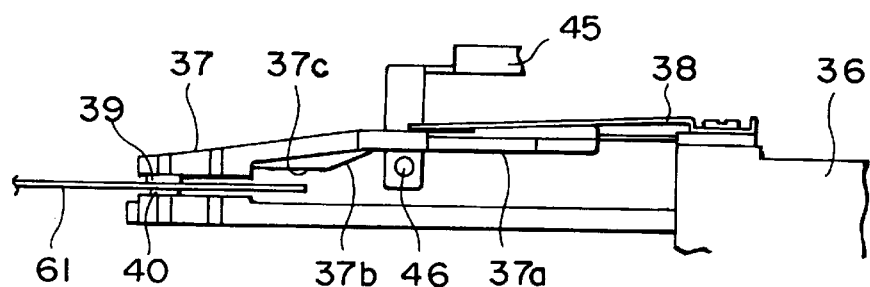
Figure 22C:
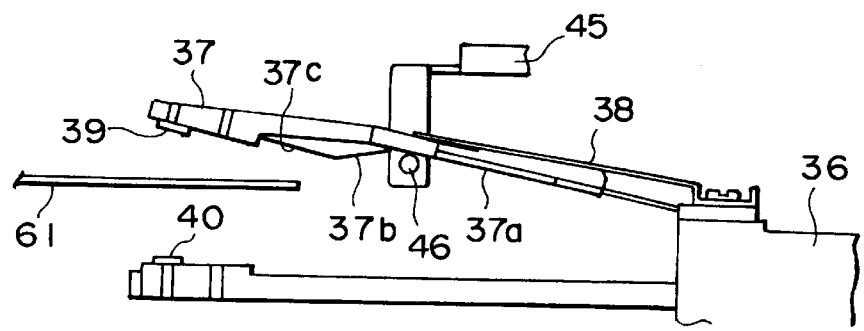
Figure 23:
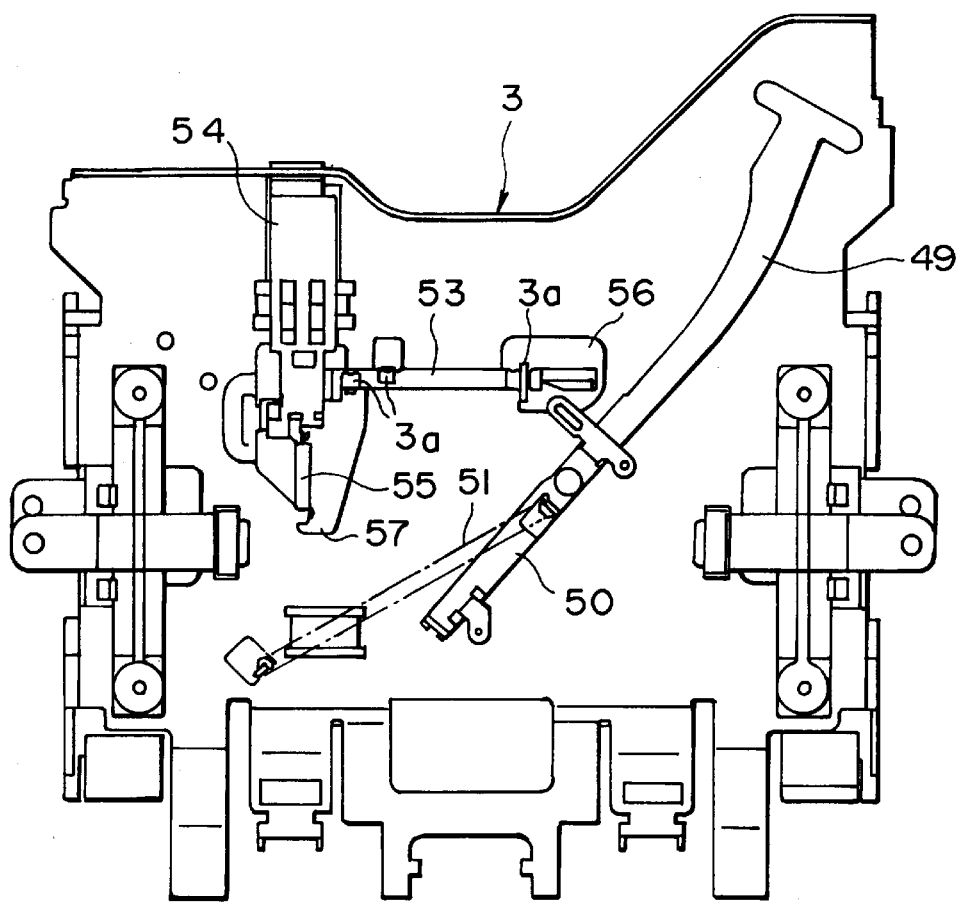
FIG. 23 is a plan view of the holder.
Figure 24:
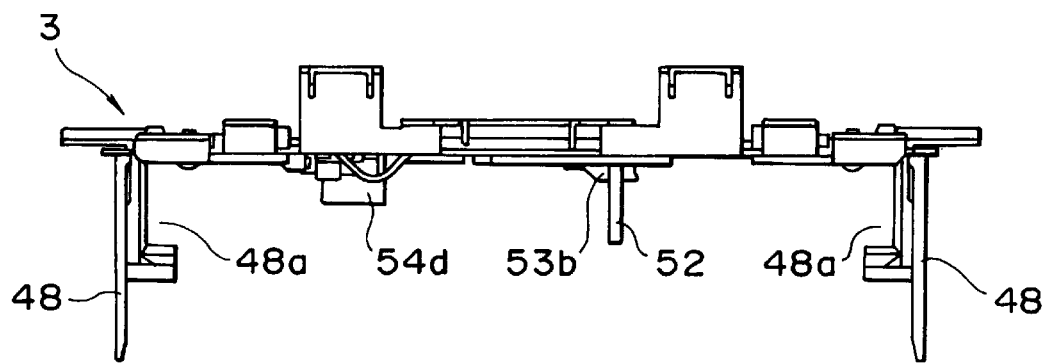
FIG. 24 is a front view of the holder.
Figure 25:
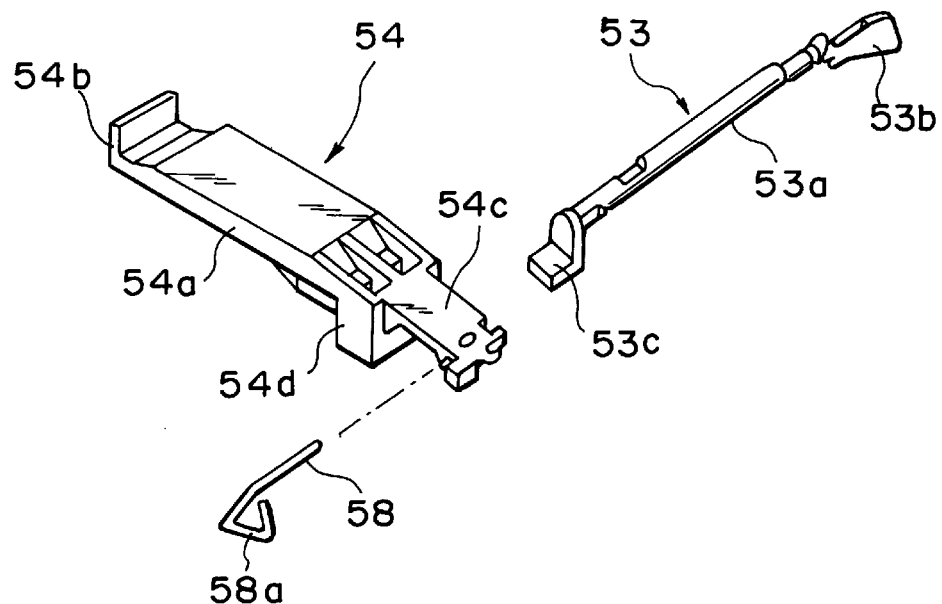
FIG. 25 is an exploded perspective view of the stopper means.
Figure 26:
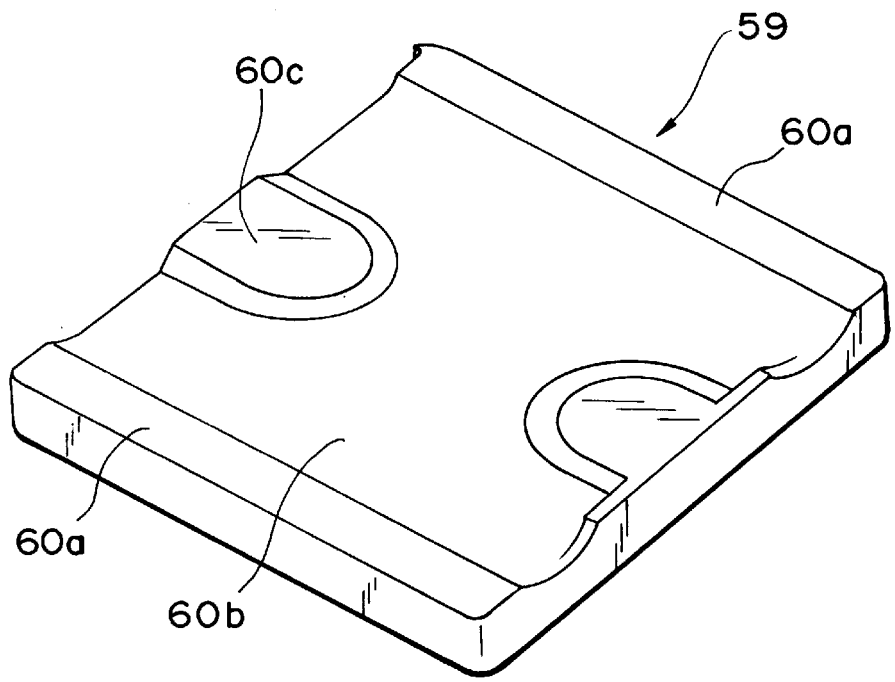
FIG. 26 is a perspective view of the disk cartridge.
Figure 27:
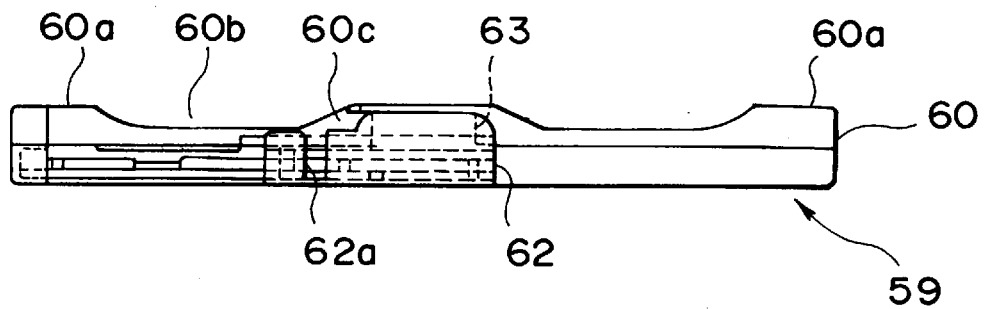
FIG. 27 is a front view of the disk cartridge.
Figure 29A:
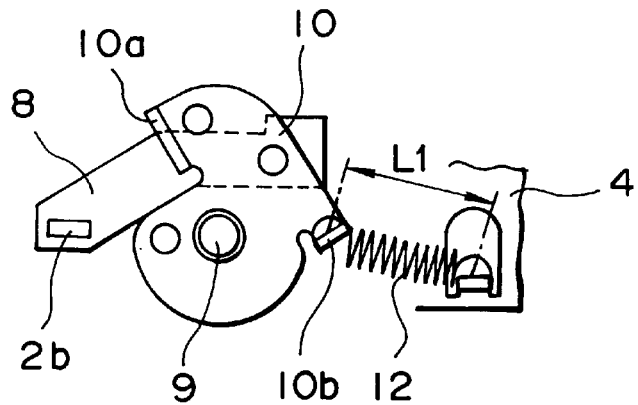
FIGS. 29A to 29C are views illustrating the operations of the auxiliary lever.
Figure 29B:
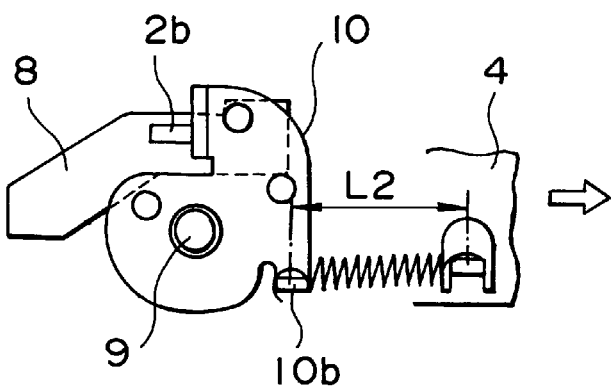
Figure 29C:
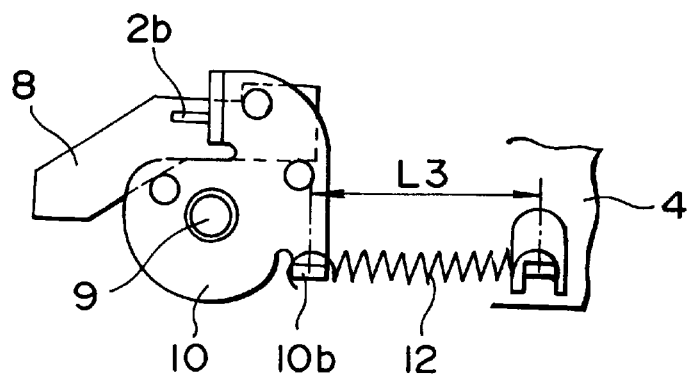
Figure 30A:
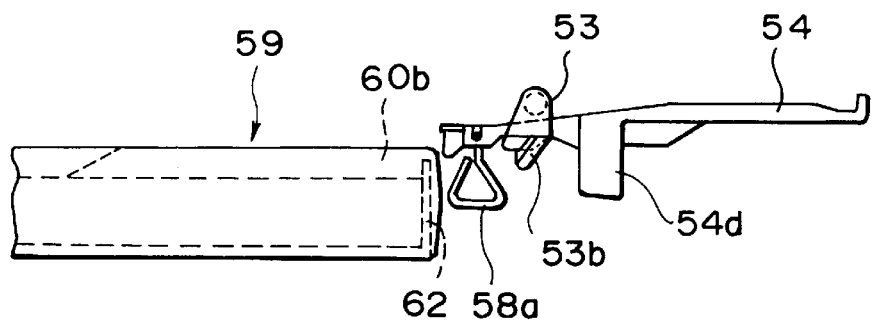
FIGS. 30A to 30D are views illustrating the operations of the stopper means, as seen from the side face direction thereof.
Figure 30B:
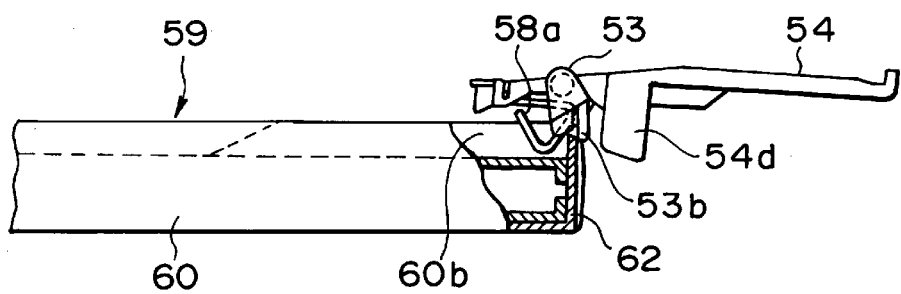
Figure 30C:
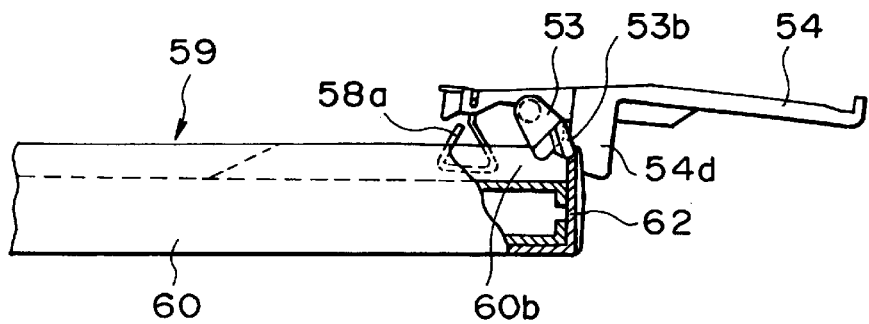
Figure 30D:
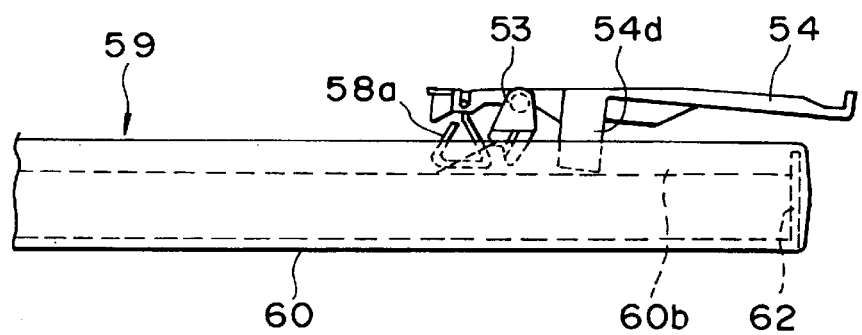
Figure 31A:
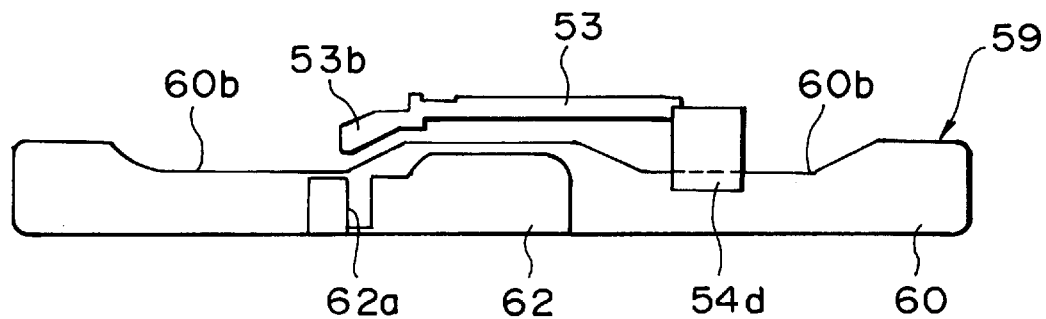
FIGS. 31A to 31C are views illustrating the operations of the stopper means, as seen from the rear face direction thereof.
Figure 31B:
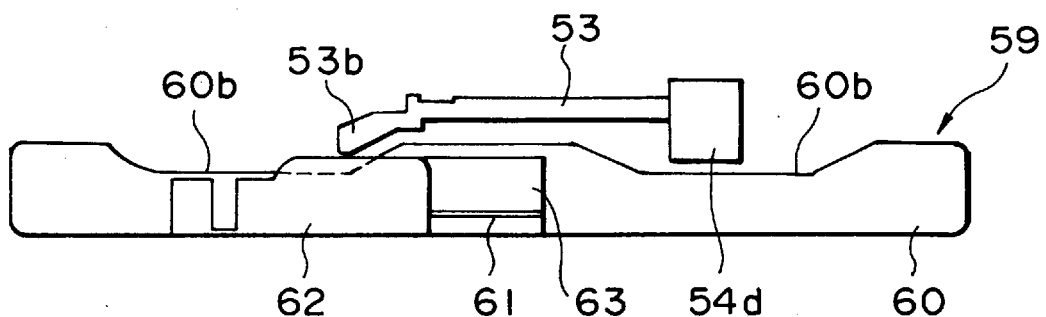
Figure 31C:
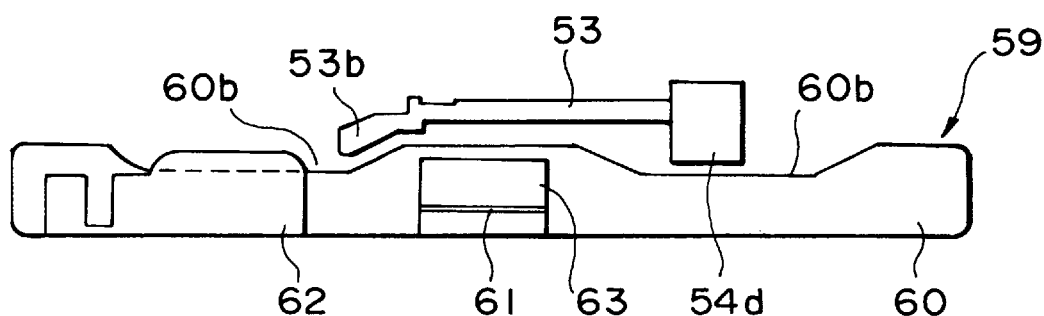

A description will now be given of preferred embodiments of the present invention, with reference to the drawings. FIG. 1 is a plan view of a magnetic recording/reproducing apparatus of an embodiment in accordance with the present invention. FIG. 2 is a right view thereof. FIG. 3 is a bottom view thereof. FIG. 4 is a plan view of the main chassis. FIG. 5 is a right side view of the main chassis. FIG. 6 is a plan view showing the main chassis having the eject lever, the first lock lever, and the like, mounted thereto. FIG. 7 is a sectional view showing the mounting plate in a mounted state. FIG. 8 is a side view of the auxiliary lever in a mounted state. FIG. 9 is a plan view of the eject lever. FIG. 10 is a side view of the eject lever. FIG. 11 is a plan view of the sub-chassis. FIG. 12 is a plan view showing the sub-chassis having the head transfer mechanism and the like mounted thereto. FIG. 13 is a side elevational view thereof. FIG. 14 is a plan view of the supporting plate. FIG. 15 is a rear view thereof. FIG. 16 is a sectional view taken along line XVI—XVI of FIG. 14. FIG. 17 is a sectional view taken along line XVII—XVII of FIG. 14. FIG. 18 is a plan view of the head transfer mechanism. FIG. 19 is a side view thereof. FIG. 20 is a plan view illustrating how the head transfer mechanism is assembled. FIG. 21 is a view showing the bottom yoke and the cylindrical protrusion in an engaged state. FIGS. 22A to 22C are views illustrating the operations of the head transfer mechanism. FIG. 23 is a plan view of the holder. FIG. 24 is a front view thereof. FIG. 25 is an exploded perspective view of the stopper means. FIG. 26 is a perspective view of the disk cartridge. FIG. 27 is a front view thereof. FIGS. 28A to 28C are bottom views thereof. FIGS. 29A to 29C are views illustrating the operations of the auxiliary lever. FIGS. 30A to 30D are views illustrating the operations of the stopper means, as viewed from the side face direction thereof. FIGS. 31A to 31C are views illustrating the operations of the stopper means, as viewed from the rear face direction thereof.

As shown in FIGS. 1 to 3, the magnetic recording/reproducing apparatus of the present embodiment comprises, for example, a main chassis 1 formed by bending a metal sheet blank, a sub-chassis 2 supported so as to be capable of moving horizontally and vertically above the main chassis 1, a holder 3 secured at an upper open end of the main chassis 1, and an eject lever mounted to the right side face of the main chassis 1. As described later, when a disk cartridge is inserted into the holder 3, the sub-chassis 2 moves to a loaded position, whereas when the eject lever 4 is pushed, the sub-chassis 2 moves to a loaded position.

As shown in FIGS. 4 to 6, the main chassis 1 includes a pair of upstanding walls 1b disposed on the left and right sides of a bottom surface 1a and formed by bending part of the main chassis 1 vertically. As shown in FIG. 5, two cam holes 5 and two through holes 6 are formed in each of the upstanding walls 1b, so that there are a total of four cam holes 5 and four through holes 6 in the left and right upstanding walls 1b. Metallic mounting plates 7 (FIG. 6) are screwed onto the four corners of the main chassis 1. Mounting these mounting plates 7 to an apparatus body (not shown) through shock-absorbing rubber or the like resiliently supports the entire magnetic recording/reproducing apparatus, including the main chassis 1, in the apparatus body. Each mounting plate 7 has a stopper piece 7a that is inserted into its associated through hole 6 so as to extend to the inner side of the upstanding walls 1b. As is clear from FIG. 7, each stopper piece 7a is bent so as to form an acute angle with respect to its associated upstanding wall 1b, so that when screwing the mounting plates 7 to the upstanding wall 1b, the stopper pieces 7a can be used to temporarily retain the mounting plates 7 to the upstanding walls 1b. In order to make common the component parts, in the present embodiment, all of the mounting plates 7 include stopper pieces 7a, but the stopper pieces 7a of the two mounting plates 7 at the front side of the main chassis, that is those at the lower side in FIG. 6, may be eliminated. In this case, the stopper pieces 7a of the two rear mounting plates 7 serve as stopper members for controlling the forward movement position of the sub-chassis 2.

Of the two upstanding walls 1b of the main chassis 1, the one at the right includes an opening 8 (FIG. 5). An auxiliary lever 10 is rotatably supported by a supporting shaft 9 formed so as to protrude below the opening 8. As shown in FIG. 8, the auxiliary lever 10 includes a contact portion 10a and an engaging piece lob, both of which are formed by bending part of the auxiliary lever 10. A plurality of protrusions 10c are formed in the plate face of the auxiliary lever 10. The aforementioned eject lever 4 is forwardly movably mounted to the right upstanding wall 1b, and, as shown in FIGS. 9 and 10, has a cover 4a projecting outwardly, and an inwardly-bent sliding piece 4b. As shown in FIG. 2, a spring 11 is provided between the eject lever 4 and the upstanding wall 1b. The resilient force of the spring 11 always biases the eject lever 4 towards the front side of the main chassis. A spring 12 is provided between the eject lever 4 and the engaging piece 10b of the lever 10. A large portion of the auxiliary lever 10 is covered by the cover 4a of the eject lever 4.

Returning back to FIG. 4 and FIG. 6, a stopper protrusion 13 and a guide protrusion 14 are provided at the bottom surface 1a of the main chassis 1. As shown in FIG. 6, the sliding piece 4b of the eject lever 4 is guided by the guide protrusion 14 so as to be movable horizontally. A first lock lever 15 is rotatably supported on the bottom surface 1a of the main chassis 1 by a shaft 16, and includes a lock portion 15a and a receiving portion 15b. The first lock lever 15 is biased clockwise in FIG. 6 by a spring 17. The receiving portion 15b opposes a releasing portion 4c formed at an end of the sliding piece 4b of the eject lever 4.

As shown in FIG. 11, a second lock lever 18 and an actuator arm 19 are rotatably supported on the sub-chassis 2 about shafts 20 and 21, respectively, as centers, with an engaging hole 19a formed in the actuator arm 19. The second lock lever 18 is biased counterclockwise, in FIG. 11, by a spring 22 FIG. 12, and includes a lock portion 18a engagable with the stopper protrusion 13, and a receiving portion 18b contactable with the disk cartridge. Two guide protrusions 23 are provided on each side of the sub-chassis 2, so that a total of four guide protrusions 23 are provided on the left and right sides of the sub-chassis 2. As shown in FIG. 2, these guide protrusions 23 are inserted into the cam holes 5 in the main chassis 1. As shown in FIGS. 12 and 13, steps 2a are formed on both sides of the sub-chassis 2 at the front ends thereof. When the steps 2a contact the stopper pieces 7a of the mounting plates 7 serving as stopper members, the forward movement position of the sub-chassis 2 is controlled. A protrusion 2b (FIG. 11) is formed, by bending a material, on the right side face of the sub-chassis 2, and is inserted into the opening 8 in the main chassis 1 so as to oppose the contact portion 10a of the auxiliary lever 10 (see FIG. 8).

As shown in FIGS. 12 and 13, secured on the sub-chassis 2 are a circuit substrate 25 having mounted thereon a spindle motor 24, circuit parts for driving the motor 24, or the like; and a supporting plate 27 holding a head transfer mechanism 26 (described later). The actuator arm 19 (FIG. 11) is positioned between the sub-chassis 2 and the supporting plate 27. A pair of receiving portions 2c (FIG. 11) are formed at both sides of the sub-chassis 2. They are formed by bending part of the sub-chassis inwardly and are contactable with an end of a disk cartridge. A stopper portion 2d (FIG. 3) engagable with the lock portion 15a (FIG. 6) of the first lock lever 15 is formed at the bottom surface of the sub-chassis 2. A pair of springs 28 is provided between the sub-chassis 2 and the bottom surface 1a of the main chassis 1 (see FIG. 3). The tensile force of each spring 28 always biases the sub-chassis 2 towards the front side of the main chassis 1, that is towards the unloaded position.

The head transfer mechanism 26 includes a linear motor 29, a carriage 30 driven by the linear motor 29, and the aforementioned supporting plate 27, supporting the linear motor 29 (FIG. 18) and the carriage 30 (FIG. 19). As shown in FIGS. 14 to 17, the peripheral edge of the supporting plate 27 is bent upwardly, with a pair of grooves in the rear end thereof. A slot 27a and four supporting portions 27b, each projecting with a trapezoidal shape, are formed in the bottom surface of the supporting plate 27, with the surfaces of the supporting portions 27b being on the same plane (FIG. 14). Cylindrical protrusions 32 (FIG. 16) project upwardly from the two supporting portions 27b disposed at the far side of the guide grooves 31 (FIG. 15), with threaded portions 32a cut into the inner peripheral faces of the cylindrical protrusions 32. On the other hand, cylindrical protrusions 33 (FIG. 17) protrude downwardly from the two supporting portions 27b disposed near the guide grooves 31, with threaded portions 33a cut into the inner peripheral faces of the cylindrical protrusions 33. Although it is desirable to integrally form the cylindrical protrusions 32 and the cylindrical protrusions 33 with the supporting plate 27 by burring, the latter cylindrical protrusions 33 can be eliminated. In such a case, threaded holes are formed directly in the plate surfaces of the supporting portions 27b.

As shown in FIGS. 18 and 19, guide shafts 34 and 35 are formed, respectively, at the center portion and at the right side portion of the supporting plate 27, and are used to guide the carriage 30 in the direction of the diameter of a magnetic disk (described later). The carriage 30 includes a base 36 (FIG. 19) having a pair of arms 36a, and an arm 37 hinged to the upper surface of the base 36 through a spring. The arm 37 is biased towards the base 36 by a load spring 38. The base 36 is inserted into the guide shaft 34, with the arm 36a engaging the guide shaft 35. As shown in FIG. 19, at the lower surface of the arm 37 is continuously formed from the rear end to the front end thereof, a first flat portion 37a, an inclined portion 37b, and a second flat portion 37c. An upper magnetic head 39 is mounted to the front end of the second flat portion 37c. A lower magnetic head 40 opposes the top magnetic head 39. A protrusion (not shown) contactable with the front end of the actuator arm 19 (FIG. 11) is formed at the lower surface of the base 36. The engaging hole 19a of the actuator arm 19 is co-extensive with the slot in the supporting plate 27.

As shown in FIG. 18, linear motor 29 includes an excitation coil 41, a bottom yoke 42 and a top yoke 43 forming a magnetic circuit, and a magnet 44. One set each of these component parts is disposed at the left and right portions of the base 36. The excitation coils 41 are secured to their corresponding arms 36a of the base 36, with the I-shaped bottom yokes 42 inserted into the corresponding excitation coils 41. Each magnet 44 is secured to the lower surface of its associated top yoke 43 The magnets 44 and the top yokes 43 are placed on their corresponding bottom yokes 42 through their corresponding excitation coils 41. Both ends of the top yokes 43 and the bottom yokes 42 are secured to the supporting plate 27, with the setscrews 45 screwed into the threaded portions 32a and 33a, respectively.

In assembling the head transfer mechanism 26 with the above-described construction, the carriage 30 having the excitation coils 41 fixed thereto and the guide shafts 34 and 35 are previously installed on the supporting plate 27. After screwing the supporting plate 27 onto the sub-chassis 2, the bottom yokes 42 and the top yokes 43, placed upon each other, are secured to the supporting plate 27. As shown in FIG. 20, each bottom yoke 42 has a cutout 42a and a hole 42b on each side thereof, and is inserted into its associated excitation yoke 41, starting from the cutout 42a side thereof, in the direction of the arrow of FIG. 20. During the insertion, horizontal shifting of each bottom yoke 42 is prevented by its associated guide groove 31 in the supporting 27. After the bottom yokes 42 have been inserted into their respective excitation coils, the cutouts 42a contact the outer peripheral surface of their respective cylindrical protrusions 32, as shown in FIG. 21, so that at this point the front ends of the bottom yokes 42 in the insertion direction thereof are positioned by the cutouts 42a and the cylindrical protrusions 32, while the rear ends of the bottom yokes 42 are positioned by their corresponding grooves 31. Thus, with the bottom yokes positioned, when the top yokes 43 are placed upon their corresponding bottom yokes 42, it is possible to easily screw the setscrews 71 into their corresponding threaded portions 32a and 33a from above the top yokes 43.

Returning back to FIG. 1, the holder 3 and a bridge plate 71 are secured to the upper open end of the main chassis 1, with a drive pin and a control pin 47 secured to the bridge plate 45. The control pin 47 extends directly below and into the engaging hole 19a in the actuator arm 19. The control pin 47 moves, with the movement of the sub-chassis 2, to rotate the actuator arm 19. The drive pin 46 extends horizontally and downwardly of the arm 37 of the carriage 30. With the sub-chassis 2 at the loading position, when the drive pin 46 is in contact with the second flat portion 37c, the upper magnetic head 39 is separated from the lower magnetic head 40, as shown in FIG. 22A, whereas when the drive pin 46 is positioned adjacent to the first flat portion 37a, the upper magnetic head 39 is biased towards the lower magnetic head 40 due to the load spring 38, as shown in FIG. 22B. With the sub-chassis in the lower unloaded position, when the drive pin 46 is in contact with the first flat portion 37a of the arm 37, the distance between the upper magnetic head 39 and the lower magnetic head 40 is greatest, as shown in FIG. 22C.

As shown in FIGS. 23 and 24, guide members 48, made of synthetic resin, are formed on both sides of the holder 3. Guide grooves 48a for inserting a disk cartridge (described later) are formed in the inner surfaces of the guide members 48. These guide grooves 48a form the path for disk cartridge insertion. A guide hole 49 is formed in the upper surface of the holder 3, with a shutter opening-and-closing member 50 engaging the guide hole 49. The shutter opening-and-closing member 50 is disposed at the starting end of the guide hole 49, as a result of being biased unidirectionally by a spring 51. An opening-and-closing pin 52 is provided so as to extend downwardly of the holder 3. A first rotary member 53 and a second rotary member 54, both of which form the stopper means, are supported at the upper surface of the holder 3, with the second rotary member 54 biased downwardly of the holder 3, that is towards the bottom surface of the main chassis 1, by a spring 55.

As shown in FIG. 25, the first rotary member 53 includes a shaft-like portion 53a extending substantially perpendicular to the insertion direction of the disk cartridge, with a detecting portion 53b and a cam portion 53c integrally formed with both ends of the shaft-like portion 53a. The shaft-like portion 53a is rotatably supported by a plurality of cut-and-raised pieces 3a (FIG. 23) formed at the upper surface of the holder 3. The detecting portion 53b and the cam portion 53c extend downward through through holes 56 and 57 (FIG. 23) formed in the upper surface of the holder 3. The second rotary member 54 includes a plate-like portion 54a extending substantially perpendicular to the shaftlike portion 53a of the first rotary member 53. A bent portion 54b and a receiving portion 54c are integrally formed with both ends of the plate-like portion 54a. From the plate-like portion 54a, a contact portion 54d extends downward through a through hole 57. The bent portion 54b is rotatably supported by a cutout (now shown) formed at the rear end of the upper surface of the holder 3. In the through hole 57, the receiving portion 54c is placed upon the cam portion 53c of the first rotary member 53. A controlling member 58 is rotatably supported by the front end of the receiving portion 54c, and is made of a wire rod, with one end thereof bent into a triangular shape to form a triangular rotary portion 58a.

Figure 28:
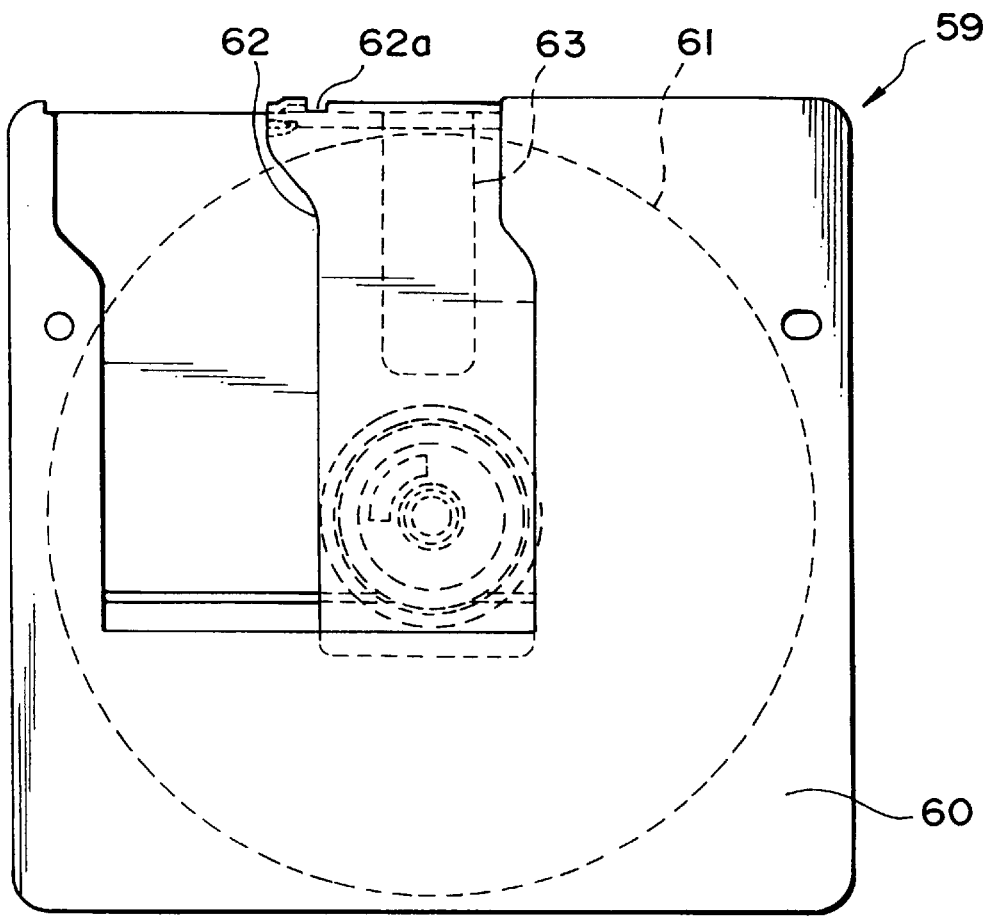
FIG. 28 is a bottom view of the disk cartridge.

As shown in FIGS. 26 to 28, the aforementioned disk cartridge 59 includes a cartridge case 60 made of hard synthetic resin and having a pair of top and bottom case portions that are joined and integrally formed with respect to each other, a magnetic disk 61 rotatably contained in the cartridge case 60, and a shutter 62 reciprocably disposed on the cartridge case. The shutter 62 is biased in the closing direction of an opening (described later) by a spring (not shown). The shutter 62 is bent into an L-shape, extending from the front face to the lower face, with a cutout 62a formed in the front face thereof. Although the lower face of the cartridge case 60 is flat, the upper surface is uneven. More specifically, protrusions 60a are formed on both sides of the upper surface of the cartridge case 60, and a recess 60b is formed between the two protrusions 60a. In the recess 60b, a protuberance 60c is formed at the front portion of the cartridge 60, with an opening 63 disposed directly below the protuberance 60c, extending from the lower surface to the front end surface of the cartridge case 60.

A description will now be given of the operation of the magnetic recording/reproducing apparatus having the above-described construction. For easier understanding, a description will first be given of the case where the controlling member 58 is unmounted. When the disk cartridge 59 is not loaded, the sub-chassis 2 (FIG. 11) is biased towards the front side of the main chassis 1 by the pair of springs 28. As shown in FIG. 2, each guide protrusion 23 is disposed at the lower end of its associated cam hole 5, and the sub-chassis 2 moves down towards the bottom surface 1a of the main chassis 1 to the unloaded position. When the lock portion 18a of the second lock lever 18 (FIG. 11) contacts the stopper protrusion 13 (FIG. 4) at the main chassis 1, the movement of the sub-chassis 2 is locked. At this time, as shown in FIG. 29A, the protrusion 2b of the sub-chassis 2 is separated from the contact portion 10a of the auxiliary lever 10, so that the spring force of the spring 12 does not act on the sub-chassis 2. The base of the carriage 30 (FIG. 19) contacts the auxiliary arm 19 (FIG. 11) and is biased rearward of the supporting plate 27, so that external vibration does not cause the carriage 30 to move. As shown in FIG. 22C, the drive pin 46 contacts the first flat portion 37a of the arm 37, so that the distance between the upper magnetic head 39 and the lower magnetic head 40 is greatest. Here, the detecting portion 53b (FIG. 25) and the contact portion 54d are located in the insertion path of the disk cartridge 59, so that they are located closer to the front side of the main chassis 1 than the upper magnetic head 39.

When the disk cartridge 59 is inserted from an opening (not shown) in the front side of the apparatus into the holder 3 along the grooves 48a of the guide members 48 (FIG. 24) in the direction arrow A (FIG. 1), the opening 63 (FIG. 28) of the shutter 62 of the disk cartridge 59 is at first closed. As shown in FIGS. 30A and 31A, the detecting portion 53b of the first rotary member 53 opposes the recess 60b of the cartridge case 60, while the contact portion 54 of the second rotary member 54 opposes the front face of the cartridge case 60.

Continued insertion of the disk cartridge 59 into the holder 3 causes the cutout 62a of the shutter 62 of the disk cartridge 59 to engage the opening-and-closing pin 52 (FIG. 24), causing the shutter opening-and-closing member 50 to move in the guide hole 49 towards the terminal end thereof (FIG. 23), and the shutter 62 to move towards the recess 60b of the cartridge case 60 (FIG. 31B), whereby the opening 63 starts to open. As a result, as shown in FIGS. 30B and 30C, and FIG. 31B, the detecting portion 53b contacts the upper end of the moved shutter 62, causing rotation of the first rotary member 53. The rotation thereof is transmitted to the receiving portion 54c through the cam portion 53c that pushes the receiving portion 54c upward with respect to the holder 3. This causes the second rotary member 54, opposing the spring 55, to rotate upward upon the bent portion 54b as a fulcrum, so that the contact portion 54d moves away from the insertion path of the disk cartridge 59 and towards the recess 60b. As shown in FIGS. 30D and 31C, the detecting portion 53b and the contact portion 54d are located within the recess 60b after the opening 63 of the shutter 62 opens completely, making it possible to insert the disk cartridge 59 to the rear end of the holder 3, without blocking by the contact portion 54d. When the front face of the disk cartridge 59 pushes the receiving portion 18b(FIG. 11), while the cartridge 59 is being inserted, the second lock lever 18 rotates clockwise upon the shaft 20 as a center, thereby unlocking the sub-chassis 2. The upper magnet head 39 and the arm 37 can now move into the cartridge case 60 from the opening 63.

When the disk cartridge 59 is inserted to the rear end of the holder 3, the front face of the cartridge case 60 strikes the receiving portion 2c of the sub-chassis 2, which is pushed by the insertion force of the disk cartridge 59. Therefore, the guide protrusions 23 move along the cam holes 5 in the main chassis 1 towards the upper end side thereof (FIG. 2), so that the sub-chassis 2, opposing the tensile force of the spring 28, moves forwardly upward towards the upper surface of the holder 3, thereby reaching the loaded position. At the loading position, the protrusion 2b of the sub-chassis 2 moves within the opening 8 and pushes the contact portion 10a of the auxiliary lever 10, so that, as shown in FIG. 29B, the auxiliary lever 10 rotates slightly clockwise upon the supporting shaft 9 as a center, with the length of the spring 12 increasing from a substantially natural length L1 to L2. In addition, at the loaded position, the first lock lever 15 (FIG. 6) rotates clockwise upon the shaft 16 as a center. When the lock portion 15a thereof engages the stopper portion 2d (FIG. 3) of the sub-chassis 2, the sub-chassis is locked at the loaded position. When the sub-chassis 2 moves forward with respect to the main chassis, the control pin 47 (FIG. 1) provided at the bridge plate 45 causes the actuator arm 19 (FIG. 11) to rotate, so that the actuator arm 19 no longer controls the movement of the base 36, thereby allowing the carriage 30 to move freely along the guide shafts 34 and 35. For example, dropping the apparatus, when the sub-chassis 2 is at the loaded position, causes a large external force to be applied thereto, which causes the sub-chassis 2 to oppose the retaining force of the first lock lever 15 and move further forward. In such a case, however, the steps 2a of the sub-chassis contact the stopper pieces 7a of both of the mounting plates 7 secured to the rear end sides of the main chassis, thereby controlling the forward movement position of the sub-chassis 2 at the contact location, and thus preventing the structural components on the sub-chassis from being damaged or scratched.

Thus, when the disk cartridge 59 is completely inserted into the holder 3, the disk cartridge 59 is held by the holder 3 at the raised position. The spindle motor 24 moves upward with the sub-chassis 2, and engages the center hub (not shown) of the magnetic disk 61 contained in the disk cartridge 59. Driving the spindle motor 24 rotates the magnetic disk 61. The head transfer mechanism 26 is also driven in correspondence with the direction and amount of the current supplied to the excitation coils 41 of the linear motors 29, causing the carriage 30 to reciprocate in the radial direction of the magnetic disk 61 along the guide shafts 34 and 35. Here, reciprocation of the carriage 30 causes the relative position of the lower surface of the arm 37 and the drive pin 46 mounted at the bridge plate 45 to change. When the carriage 30 moves away from the magnetic disk 61 to the retract position, the drive pin 46 contacts the second flat portion 37c of the arm 37, with the upper magnetic head 39 separated from the magnetic disk 61, as shown in FIG. 22A. When the carriage 30 is moved towards the center of the magnetic disk 61, the drive pin 46 separates from the arm 37, and the resilient biasing force of the load spring 38 causes the upper magnetic head 39 to press-contact the lower magnetic head 40 through the magnetic disk 61, as shown in FIG. 22B, whereby information is recorded onto and reproduced from the magnetic disk 61 by the magnetic heads 39 and 40.

In ejecting the disk cartridge 59 from the apparatus, when the eject lever 4 is pushed forward against the spring 11, the releasing portion 4c of the eject lever 4 pushes the receiving portion 15b(FIG. 6), causing the first lock lever 15 to rotate counterclockwise. When the first lock lever 15 rotates counterclockwise, the lock portion 15a and the stopper portion 2d are disengaged, so that the sub-chassis 2 moves downward as it moves backward with respect to the main chassis, in a direction opposite to the aforementioned direction. Thus, the disk cartridge 59 is ejected from the holder 3 by the restoring force of the receiving portion 2c of the sub-chassis 2 and the spring 51, and the second lock lever 18 causes the sub-chassis 2 to be locked again at the unloaded position.

When the disk cartridge 59 is to be ejected, pushing the eject lever 4 forward extends the spring 12 to the maximum length, L3, as shown in FIG. 29C, allowing the auxiliary lever 10 to accumulate a large enough rotational force in the counterclockwise direction. Thus, when the first lock lever 15 unlocks, the sub-chassis 2 moves to the unloaded position by the biasing forces of both the spring 28 and the auxiliary lever 10.

When the disk cartridge 59 is being ejected, the head transfer mechanism 26 moves downward with the sub-chassis 2. The downward movement of the arm 37 is restricted by the drive pin 46, so that, as shown in FIG. 22C, the drive pin 46 contacts the first flat portion 37a of the arm 37, causing the upper magnetic head 39 and the lower magnetic head 40 to be greatly separated from the magnetic disk 61. Thus, it is possible to prevent the magnetic heads 39 and 40 from being scratched or damaged, since the magnetic heads 39 and 40 do not bump into the disk cartridge 59 that is being ejected.

In the insertion operation of the disk cartridge 59 described above, when, for example, the disk cartridge 59 is inserted into the holder 2 with too much force, the opening-and-closing pin 52 bounces off the shutter 62 and moves out of the cutout 62a, which may prevent the shutter 62 from opening. In such a case, when insertion of the disk cartridge 59 into the holder 2 is continued, the detecting portion 53b of the first rotary member 53 moves into the recess 60b of the cartridge case 60, without contacting the shutter 62. Thus, the second rotary member 54 does not rotate, so that the contact portion 54b stays at the insertion path of the disk cartridge 59. Therefore, at a location just in front of a location where the disk cartridge 59 bumps into the magnetic heads 39 and 40, the front face of the cartridge case 60 contacts the contacting portion 54b to thereby prevent further insertion of the disk cartridge 59.

A description will now be given of the controlling member 58 (FIG. 25). When the disk cartridge 59 is being inserted, the detecting portion 53b of the first rotary member 53 contacts the shutter 62, and the detecting portion 53b and the contact portion 54d are both located in the recess 60b of the cartridge case 60. Thereafter, when the controlling member 58 is provided, the disk cartridge 59 can be re-inserted after being moved back in the direction of ejection thereof. More specifically, when the disk cartridge 59 is inserted, as shown in FIG. 30A, a rotary portion 58a of the controlling member 58 contacts the front face of the cartridge case 60 and rotates, moving onto the recess 60b, as shown in FIG. 30B. Then, as shown in FIG. 30C, when the detecting portion 53b of the first rotary member 53 is rotated by the shutter 62, the rotating portion 58a rotates and is restored to its original state due to its own weight. Thereafter, as shown in FIG. 30D, the contact portion 54d of the second rotary member 54 moves onto the recess 60b. In the condition shown in FIG. 30D, the rotary portion 58a is positioned such that it cannot rotate on the recess 60b. Therefore, when the disk cartridge 59 in the condition shown in FIG. 30D is moved in the direction of ejection thereof, the detecting portion 53b contacts the upper end portion of the shutter 62, and the contact portion 54d starts to move away from the disk cartridge 59. During the time the rotary portion 58a is on the recess 60b, the second rotary member 54 is kept raised by the rotary portion 58a, so that the front face of the cartridge case 60 does not contact the contact portion 54d, even when the disk cartridge 59 is re-inserted. On the other hand, when the controlling member 58 is not provided, and the disk cartridge 5 is moved in the direction of ejection thereof, while it is being inserted, the second rotary member 54 returns back towards the insertion path of the disk cartridge 59, at the moment the contact portion 54d separates from the disk cartridge 59. Therefore, even when an attempt is made to re-insert the disk cartridge 59 immediately after this, the insertion of the disk cartridge 59 is blocked by the contact portion 54d, even though the shutter 62 is opened.

Figure 32:
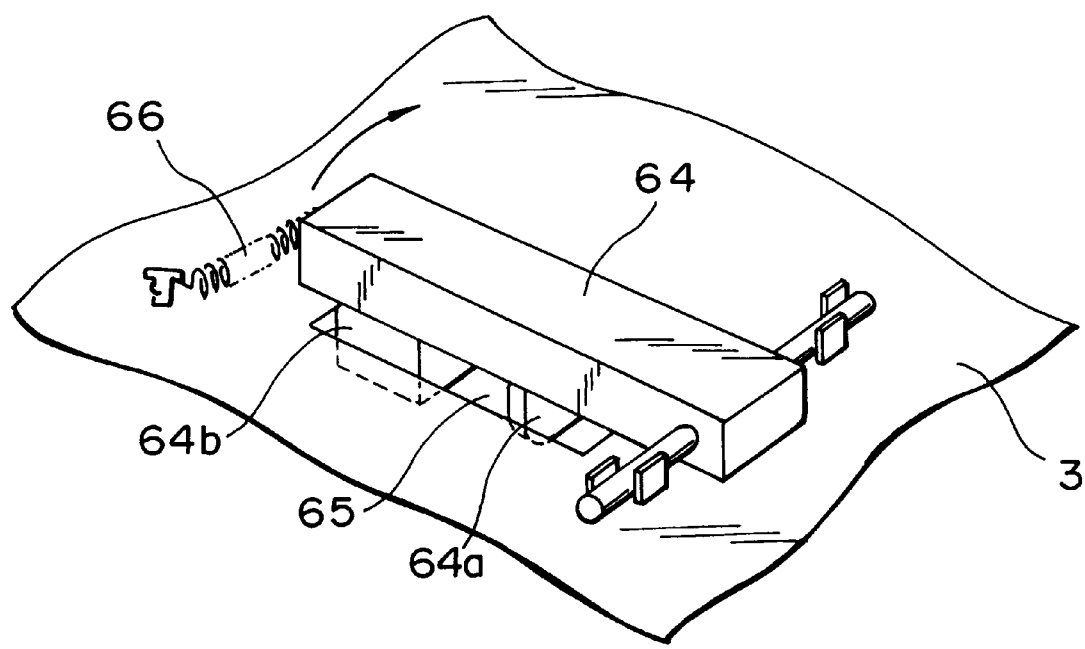
FIG. 32 is a perspective view of a second embodiment of the present invention.

In the embodiment shown in FIG. 32, a rotary member 64 rotatably supported at the upper surface of the holder 3 is used as stopper means of the above-described disk cartridge 59. The rotary member 64 includes a detecting portion 64a for detecting whether the shutter 62 is open or closed, and a contact portion 64b which can contact the front face of the disk cartridge 59 integrally formed therewith. The detecting portion 64a and the contact portion 64b extend downwards through a through hole 65 formed in the upper surface of the holder 3. The rotary member 64 is biased downward by a spring 66. When the shutter 62 of the inserted disk cartridge 59 opens properly, the detecting portion 64a contacts the shutter 62 to rotate the rotary member 64 in the direction of the arrow, causing the contact portion 64b to move out of the insertion path of the disk cartridge 59. On the other hand, when the shutter 62 fails to open, the rotary member 64 does not rotate, since the detecting portion 64a does not contact the shutter 62, so that the contact portion 64b contacts the front face of the disk cartridge, thus preventing insertion thereof.

As can be understood from the foregoing description, the present invention provides the following advantages.

A stopper means for stopping insertion of a disk cartridge, when the shutter is not open, and allowing insertion of the disk cartridge, when the shutter is open, is provided in a disk drive device including a head transfer mechanism for transferring a head in a direction of a diameter of a disk, and a shutter opening-and-closing member movably supported by a holder. In the disk drive device, when a disk cartridge containing the disk is inserted into or removed from the holder, a shutter opening-and-closing member of the disk cartridge opens or closes the shutter. Such a stopping means can stop the disk cartridge at a location just in front of the loading position, if, by any chance, the shutter fails to open because, for example, the shutter opening-and-closing pin bounces off the shutter, thereby reliably preventing the head from being scratched or damaged.

In a construction, a stopper means is formed by a stopper member rotatably supported by the holder, with the stopper member including a detecting portion for detecting whether the shutter is open or closed, and a contact portion disposed at the front face of the disk cartridge in the direction of insertion thereof. In such a construction, when the shutter fails to open, the contact portion stops the insertion of the disk cartridge, whereas when the shutter is opened, the detecting portion contacts the shutter in order to rotate the stopper member, causing the contact portion to move out of the insertion path of the disk cartridge, so that it is possible to insert the disk cartridge to the loading position.

In a construction, the stopper member may comprise a first rotary member and a second rotary member which engage each other through a cam portion, with the first rotary member including a detecting portion, and the second rotary member including the contact portion. In such a construction, it is possible to freely set the timing at which the detecting portion contacts the shutter and starts to rotate the first rotary member, and the timing at which the contact portion, with the movement of the first rotary member, starts to move out of the insertion path of the disk cartridge.

When the first rotary member and the second rotary member cross at substantially right angles to each other, the second rotary member provides the required stopper strength, allowing the first rotary member to rotate with a small force.

In addition, when the first rotary member and the second rotary member are each rotatably supported at the upper surface of the holder, such that the detecting portion and the contact portion extend downward through a through hole in the upper surface of the holder, the space within the apparatus can be effectively used, thus preventing larger apparatuses from being produced.

Further, when a spring is provided between the second rotary member and the holder in order to bias the contact portion in the insertion path direction of the disk cartridge, not only can the contact portion be reliably restored back into the insertion path of the disk cartridge, but the first rotary member can also be restored back to its initial position through the second rotary member.

Further, a controlling member, which contacts the upper surface of the disk cartridge, may be provided so as to be rotatably supported by the second rotary member. When the controlling member is used to keep the contact portion out of the insertion path, after the detecting portion moves over the shutter, the disk cartridge can be moved back slightly and then re-inserted, during insertion of the disk cartridge, after the contact portion moves out of the insertion path of the disk cartridge.

Although the disk cartridge can take any form, a recess, allowing passage of the detecting portion, may be formed in the disk cartridge. When the shutter is made to move towards the front open end of the recess, but the shutter fails to open, a detecting portion passes above the recess, so that the detecting portion can contact the shutter only when the shutter is successfully opened.

What is claimed is:

1. A mechanism in disk drive apparatus including a holder and a shutter opening-and-closing member movably supported by the holder, wherein when a disk cartridge containing a disk is inserted into the holder, the shutter opening-and-closing member opens a shutter of the disk cartridge to allow magnetic heads to access the disks whereas when the disk cartridge is removed from the holder, said shutter opening-and-closing member closes the shutter, said mechanism comprising:

stopper means for detecting whether the shutter is open or closed to selectively block insertion of the disk cartridge into the holder, said stopper means blocking the insertion of the disk cartridge when the shutter fails to open, whereas said stopper means moving out of an insertion path of the disk cartridge to allow the insertion of the disk cartridge when the shutter is open.

2. A mechanism according to claim 1, wherein said stopper means comprises a stopper member rotatably supported by the holder, said stopper member including a detecting portion for detecting whether the shutter is open or closed, and a contact portion for blocking the insertion of the disk cartridge into the holder, wherein when the shutter opening-and-closing member opens the shutter, said detecting portion moves said contact portion out of the insertion path of the disk cartridge and allows the insertion of the disk cartridge into the holder.

3. A mechanism according to claim 2, wherein said stopper member comprises a first rotary member and a second rotary member, said first rotary member including said detecting portion, and said second rotary member including said contact portion, wherein when the shutter opening-and-closing member opens the shutter said detecting portion rotates said first rotary member which then rotates said second rotary member to move said contact portion out of the insertion path of the disk cartridge and allow the insertion of the disk cartridge into the holder.

4. A mechanism according to claim 3, wherein said first rotary member and said second rotary member are arranged at substantially a right angle to each other.

5. A mechanism according to claim 4, wherein the holder has a surface in which through holes are formed, said first rotary member and said second rotary member are each rotatably supported on said surface, and said detecting portion and said contacting portion extend inside the holder through said through holes.

6. A disk drive device according to claim 5, further comprising a spring disposed between said second rotary member and the holder for biasing said contact portion in a direction of the insertion path of the disk cartridge.

7. A mechanism according to claim 6, further comprising a controlling member rotatably supported by said second rotary member, wherein when the disk cartridge is removed, said controlling member comes in contact with the disk cartridge and keeps said contact portion out of the insertion path of the disk cartridge for a while after the shutter is closed.

8. A mechanism according to claim 7, wherein the disk cartridge has a recess in which said detecting portion passes and the shutter moves towards said recess when the disk cartridge is being inserted in the holder.

* * * * *

UNITED STATES PATENT AND TRADEMARK OFFICE
CERTIFICATE OF CORRECTION

PATENT NO. : 5,940,248
DATED : August 17, 1999
INVENTOR(S) : Osamu Shigenai et al.

It is certified that error appears in the above-indentified patent and that said Letters Patent is hereby corrected as shown below:

On the Title Page

In column 2, line 1, under "ABSTRACT", delete "A" and change "first" to --First--.

In claim 1, line 6, change "disks" to --disk,--.

In claim 1, line 14, change "moving" to --moves--.

In claim 3, line 7, after "member" insert --,-- (comma).

Signed and Sealed this

Fourteenth Day of March, 2000

Attest:

Q. TODD DICKINSON

Attesting Officer     Commissioner of Patents and Trademarks